(12) United States Patent
Gossweiler, III et al.

(10) Patent No.: US 6,441,817 B1
(45) Date of Patent: Aug. 27, 2002

(54) METHODS AND APPARATUSES FOR PERFORMING Z-BUFFER GRANULARITY DEPTH CALIBRATION IN GRAPHICS DISPLAYS OF THREE-DIMENSIONAL SCENES

(75) Inventors: Richard Carl Gossweiler, III, Sunnyvale; Bernardo A. Huberman, Palo Alto, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,237

(22) Filed: Nov. 29, 1999

(51) Int. Cl.$^7$ ............................................... G06T 17/00

(52) U.S. Cl. ........................................................ 345/422

(58) Field of Search ........................... 345/418, 419, 345/420, 421, 422, 423, 424, 426, 427, 428

(56) References Cited

U.S. PATENT DOCUMENTS

| | | | | |
|---|---|---|---|---|
| 6,094,198 A | * | 7/2000 | Shashua | 345/419 |
| 6,104,407 A | * | 8/2000 | Aleksic et al. | 345/428 |
| 6,160,557 A | * | 12/2000 | Narayanaswami | 345/422 |
| 6,246,415 B1 | * | 6/2001 | Grossman et al. | 345/422 |
| 6,252,608 B1 | * | 6/2001 | Snyder et al. | 345/422 |

* cited by examiner

*Primary Examiner*—Cliff N. Vo
(74) *Attorney, Agent, or Firm*—Fliesler Dubb Meyer & Lovejoy LLP

(57) ABSTRACT

The weight given to each object in a scene in the computation of the z-buffer granularity is determined based upon a variable normalized risk parameter which may be supplied by the application. A recursive composite parent object process is invoked upon the two children of the scene object in order to allocate graphics resources to objects A and B. Primary and secondary hit value means corresponding to objects A and B are computed. The hit value means are the average sum of hit values recorded for all the leaf objects contained by the objects over a predetermined number of frames. The statistical variances of the primary hit value and secondary hit value are also computed over the previous predetermined number of frames in order facilitates the mapping of the normalized risk parameter to a non-normalized risk parameter indicating the optimal risk for objects A and object B. A quadratic parametric variance equation is solved for the optimal fraction of the remaining graphics resources to be allocated to object A. The optimal fraction is multiplied by the available graphics resources, resulting in the resources allocated to object A; the remaining graphics resources are to object B. If either object A or B is a composite parent object, the recursive parent object process is invoked on the two children of object A or B with the available graphics resources for the instantiation of the recursive parent object process set to the graphics resources allocated to object A or B. The resources allocated each object are then used as weighting factors in the computation of the z-buffer granularity. In an embodiment, the z-buffer midpoint depth is determined by dividing the sum of the multiplicative products of the distance from the observation point, the allocated resources, and the importance coefficient for each object by the sum of the products of the observation point and the allocated resources for each object.

26 Claims, 18 Drawing Sheets

|  | OBJECTS 801 802 803 | | |
|---|---|---|---|
| FRAME | J | K | L |
| -1 | 1 | 0 | 0 |
| -2 | 1 | 0 | 1 |
| -3 | 1 | 0 | 0 |
| -4 | 1 | 0 | 1 |
| -5 | 1 | 1 | 0 |
| -6 | 1 | 1 | 1 |
| -7 | 1 | 1 | 0 |
| -8 | 1 | 1 | 1 |
| -9 | 0 | 1 | 0 |
| -10 | 0 | 1 | 0 |

FIG. 8

|  | OBJECTS | | |
|---|---|---|---|
| FRAME | L | K | J |
| -1 | 5000 | 0 | 2000 |
| -2 | 5000 | 0 | 2000 |
| -3 | 5000 | 1000 | 1000 |
| -4 | 5000 | 1000 | 1000 |
| -5 | 5000 | 1000 | 1000 |
| -6 | 2000 | 4000 | 0 |
| -7 | 1000 | 4000 | 0 |
| -8 | 0 | 4000 | 0 |

FIG. 11

| PIXEL | | VALUE |
|---|---|---|
| RED | R | $R_{PIX}$ |
| GREEN | G | $G_{PIX}$ |
| BLUE | B | $B_{PIX}$ |
| DEPTH | Z | $Z_2 Z_1 Z_0$ |

| OBJECT IN FRAME Ø | IMPORTANCE COEFFICIENT U | DISTANCE FROM OBSERVER d | ALLOCATED RESOURCES R |
|---|---|---|---|
| J | 2.5 | 16 ft. | 0.249 |
| K | 2.0 | 4 ft. | 0.629 |
| L | 1.5 | 9 ft. | 0.122 |

FIG. 16

| $z_{MID}$ | 8.063 ft. |
|---|---|
| DEPTH $z_2 z_1 z_0$ | RANGE |
| 000 | 0.000 to 2.015 ft. |
| 001 | 2.016 to 4.031 ft. |
| 010 | 4.032 to 6.047 ft. |
| 011 | 6.048 to 8.062 ft. |
| 100 | 8.063 to 10.078 ft. |
| 101 | 10.079 to 12.094 ft. |
| 110 | 12.095 to 14.109 ft. |
| 111 | 14.110 to 16.126 ft. |

FIG. 17

| OBJECT IN FRAME Ø | DEPTH $Z_2Z_1Z_0$ |
|---|---|
| J | 111 |
| K | 001 |
| L | 100 |

FIG. 18

METHODS AND APPARATUSES FOR PERFORMING Z-BUFFER GRANULARITY DEPTH CALIBRATION IN GRAPHICS DISPLAYS OF THREE-DIMENSIONAL SCENES

CROSS-REFERENCE TO RELATED APPLICATION

This Application is related to the following Applications, which is filed of even date herewith:

"Methods and Apparatuses for Selecting Levels of Detail for Objects Having Multi-Resolution Models in Graphics Displays," by Richard Carl Gossweiler III and Bernardo A. Huberman, U.S. patent application Ser. No. 09/450,365 filed Nov. 29, 1999 now U.S. Pat. No. 6,400,372.

BACKGROUND OF THE INVENTION

1. Field of the Invention

The present invention is related to the field of three-dimensional graphics rendering. Specifically, the present invention is related to the problem of calibrating the z-buffer granularity or depth based upon the objects in a scene.

2. Discussion of the Related Art

A Z-buffer is an area in graphics memory reserved for storing the Z-axis value of each pixel. Z-buffing is an algorithm used in 3-D graphics to determine which objects, or parts of objects, are visible and which are hidden behind other objects. With Z-buffering, the graphics processor stores the Z-axis value of each pixel in a special area of memory called the Z-buffer. Different objects can have the same x- and y-coordinate values, but with different z-coordinate values. The object with the lowest z-coordinate value is in front of the other objects, and therefore that's the one that's displayed.

3-D graphics is the field of computer graphics concerned with generating and displaying three-dimensional objects in a two-dimensional space (e.g., the display screen). Whereas pixels in a 2-dimensional graphic have the properties of position, color, and brightness, a 3-D pixels adds a depth property that indicates where the point lies on an imaginary Z-axis. When many 3-D pixels are combined, each with its own depth value, the result is a three-dimensional surface, called a texture. In addition to textures, 3-D graphics also supports multiple objects interacting with one another. For example, a solid object may partially hide an object behind it. Finally, sophisticated 3-D graphics use techniques such as ray tracing to apply realistic shadows to an image.

Converting information about 3-D objects into a bit map that can be displayed is known as rendering, and requires considerable memory and processing power. In the past, 3-D graphics was available only on powerful workstations, but now 3-D graphics accelerators are commonly found in personal computers. The graphics accelerator contains memory and a specialized microprocessor to handle many of the 3-D rendering operations.

One of the big challenges of translating 3D environments into rapidly changing 2D frames is fighting out what surfaces are hidden by other objects and should not be visible. Two techniques used to correctly position objects are called Z-sorting and Z-buffering. (The 'Z' is the Z-direction of depth.) The Z-sorting algorithm simply arranges polygons in back-to-front order before rendering, and draws the front polygons last. It produces correct results except when objects pass through other objects, in which case they appear as stacked instead of intersecting. Z-sorting is performed by the host CPU and involves considerable overhead which, naturally, translates into lower frame rates.

By contrast, Z-buffering can be effectively implemented in a hardware rendering engine, but at the expense of dedicating more memory to the job. A Z-buffer involves a block of memory equal to the display resolution (e.g. 640×480) multiplied by the number of bits of depth resolution desired (e.g. 16-bits). The Z-buffer algorithm stores a depth value for each pixel in the display. When rendering objects, the engine calculates a Z-value for each pixel and stores that value in the Z-buffer memory location corresponding to the X/Y address of the pixel in the display buffer. The lower the Z-value, the closer the object is to the viewer. When a new pixel is rendered its Z-value is compared with the Z-value of the current pixel and only if the Z-value of the new pixel is less than the one already stored will the new pixel be written to the display buffer.

When rendering 3D objects to the screen, often a z-buffer is used to sort the objects. If the z-buffer is not deep enough, or if it is too finely grained, then two objects will be sorted into the same z-buffer slot. This produces visible anomalies (shimmering) when rendering. To remedy this, developers adjust the z-buffer to be deeper or to be more finely grained based on the situation. However, when the z-buffer is calibrated based upon the objects in a changing scene, the changes in the scene may result in undesirable visual discontinuities as the z-buffer calibration results in different z-buffer depths during each frame, thereby changing the position of each object within the z-buffer from frame to frame.

When rendering 3D objects to the 2D display, a common technique is to sort the objects into a z-buffer. The rendering engine sorts the objects along the z-dimension (into the screen). The z-buffer represents a fixed amount of memory into which the objects are sorted.

Either that memory can represent a large distance (depth) or it can be fine-grained for better resolution when objects are close to one another. For example, when rendering a 3D object representing a book, then the pages are close to one another and the z-buffer must be finely partitioned to keep the objects separate. But when two objects are far apart, such as two spheres representing planets, then the z-buffer must stretch over a large distance.

Programmers can adjust the granularity of the z-buffer based on what is in the scene. When they need high resolution and depth, they must decide what is the best value. For example, they may decide that objects closer to the center of the screen are more valuable to the user, and therefore have more influence on the adjustment of the z-buffer granularity. But if the object is constantly moving in and out of the center of the screen, then this z-buffer adjustment becomes more volatile.

As is apparent from the above discussion, a need exists for determining the weights associated with the objects in a scene for performing the z-buffer calibration before rendering each frame.

SUMMARY OF THE INVENTION

Programmers can adjust the granularity of the z-buffer based on what is in the scene. When they need high resolution and depth, they must decide what is the best value. For example, they may decide that objects closer to the center of the screen are more valuable to the user, and therefore have more influence on the adjustment of the z-buffer granularity. But if the object is constantly moving in and out of the center of the screen, then this z-buffer adjustment becomes more volatile. An object of the present invention is to provide a method for determining the weights associated with the objects in a scene for performing the z-buffer calibration before rendering each frame.

According to the present invention, the weight given to each object in a scene in the computation of the z-buffer granularity is determined based upon a variable risk parameter which may be supplied by the application. In the preferred embodiment, the risk parameter is normalized assuming values between zero and one, inclusive.

The leaf objects in the scene are preferably organized into a binary tree, whose structure may indicate the importance of the leaf objects. Composite parent objects each have two children objects. Children objects are either leaf objects or composite parent objects. Each composite parent object contains both of its children objects and all of the objects contained by both of its children object. The importance ranking of objects is optionally determined by one of a variety of methods. For example, the importance ranking may be predetermined based upon the type of object. Alternatively, the importance ranking is determined by decreasing order of mean hit values determined over a predetermined number of frames. As yet another alternative, the importance ranking of the objects in the scene is determined by the distances of the objects from the observation point. For example, the closest objects may be assigned the highest importance. Some combination of the above described methods for ranking the objects may also be performed in accordance with the present invention.

In a greedy algorithm embodiment, the most important object is a child of the scene object, and each composite parent object has as its two children one leaf object and one composite parent object except the deepest composition parent object which contains the least important two leaf objects. The leaf objects decrease in importance as their depth in the binary tree in this greedy embodiment.

However, the methods of the present invention are applicable to scene having any arbitrary binary tree structure. The scene object contains all leaf objects and has no parent. A recursive composite parent object process is invoked upon the two children of the scene object. In the recursive composite parent object process, graphics resources are allocated to objects A and B. A primary hit value mean corresponding to one of object A and object B is computed. In the preferred embodiment, the primary hit value mean is the average sum of hit values recorded for all the leaf objects contained by the object over a predetermined number of frames. Hit values are, for example, binary variables which take on a zero when the leaf object is not in a central portion of the scene during a frame and takes on a one if the leaf object is in the central portion of the scene during the frame. Alternatively, the hit value is a function of a static or dynamic importance weight associated with the leaf object.

According to an aspect of the present invention, the hit values for all objects contained by the other of object A and object B are summed for each of the previous predetermined number of frames to produce a secondary hit value for each of the frames. The secondary hit value mean is computed as the average of the sum of hit values for all objects contained by the other of object A and object B.

According to another aspect of the present invention, the statistical variances of the primary hit value and secondary hit value are also computed over the previous predetermined number of frames. The computation of the statistical variances of the primary and secondary hit values according to the present invention facilitates the mapping of the normalized risk parameter to a non-normalized risk parameter indicating the optimal risk for objects A and object B. The non-normalized risk parameter is substituted into a parametric variance equation. According to the present invention, the parametric variance equation is solved for the optimal fraction of the remaining graphics resources to be allocated to object A.

In the preferred embodiment, the parametric variance equation is a quadratic equation which omits a correlation term between the primary and secondary hit values. If the primary hit value mean is greater than or equal to the secondary hit value mean, the method selects the greater solution of the quadratic variance equation as the optimal fraction. Conversely, if the primary hit value mean is less than the secondary hit value mean, the method selects the lesser solution of the quadratic variance equation as the optimal fraction. The optimal fraction is multiplied by the available graphics resources, resulting in the resources allocated to object A. The available graphics resources which are not allocated to object A are allocated to object B.

According to an embodiment of the present invention, if object A is a composite parent object, the recursive parent object process is invoked on the two children of object A with the available graphics resources for the instantiation of the recursive parent object process set to the graphics resources allocated to object A. If object B is a composite parent object, the recursive parent object process is invoked on the two children of object B with the available graphics resources for the instantiation of the recursive parent object process set to the graphics resources allocated to object B. In this manner, the total graphics resources available at the scene object is recursively divided up amongst all of the scene's leaf nodes.

According to an embodiment of the present invention, the resources allocated each object are then used as weighting factors in the computation of the z-buffer granularity. For example, in an embodiment, the z-buffer midpoint depth is determined by dividing the multiplicative product of the distance from the observation point and the allocated resources by the sum of the allocated resources for all objects. In another embodiment, the z-buffer midpoint depth is determined by dividing the sum of the multiplicative products of the distance from the observation point, the allocated resources, and the importance coefficient for each object by the sum of the products of the observation point and the allocated resources for each object.

According to another aspect of the present invention, the non-normalized risk parameter is computed by adding the normalized risk parameter times the difference between a maximum risk and minimum risk to the minimum risk. The maximum risk is the risk associated with hit value mean having the highest value.

These and other features, aspects, and advantages of the present invention are fully described in the Detailed Description of the Invention and the Figures.

BRIEF DESCRIPTION OF THE DRAWINGS

FIG. 8 illustrates histograms of the appearance in the center of the display screen over the previous ten frames in the scene of the leaf objects displayed in FIG. 2 suitable for computing the statistics required to perform the methods according to the present invention.

FIG. 11 illustrates histograms of weights corresponding to each of the leaf objects shown in the scene of FIG. 2 over the previous eight frames suitable for computing the statistics required to perform the methods according to the present invention.

FIG. 13 illustrates the color and depth fields representing a color pixel having a three-bit depth component for which the granularity is determining according to the methods of the present invention.

FIG. 16 illustrates the importance coefficients, the distances from the observer, and the allocated resources for each of the objects shown in the scene shown in FIG. 2 based upon the histograms shown in FIG. 8.

FIG. 17 illustrates the range of distances corresponding to each of the unique depth codes for a three-bit depth component determined by the methods according to the present invention corresponding to the objects described by the values shown in FIG. 16.

FIG. 18 illustrates the three-bit depth components computed in accordance with the present invention corresponding to the objects listed in FIG. 16 and shown in the scene of FIG. 2.

Figure 1:
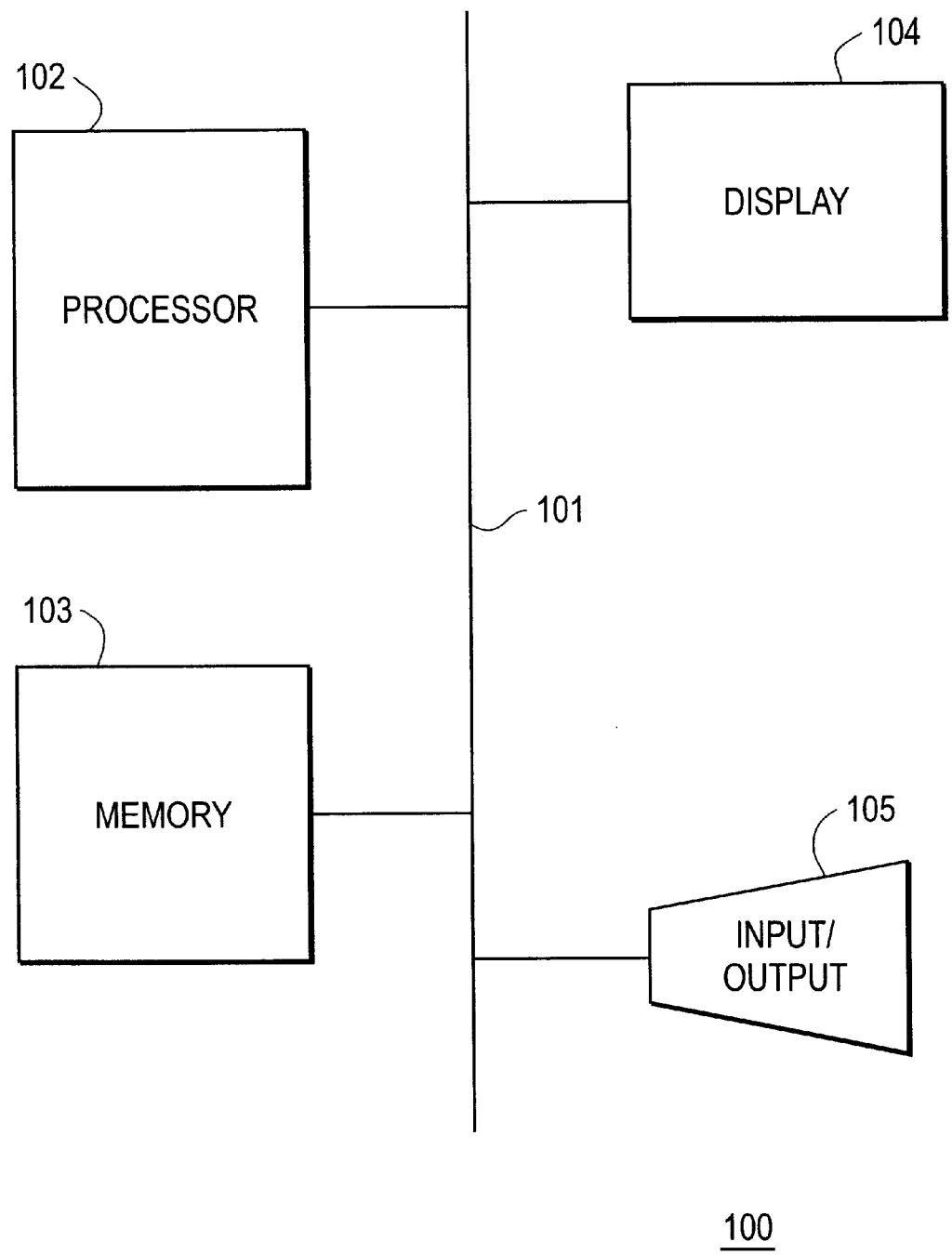
FIG. 1 illustrates a general purpose computer system suitable for executing the methods according to the present invention.

The Figures are more fully described in narrative form in the Detailed Description of the Invention.

DETAILED DESCRIPTION OF THE INVENTION

An issue addressed by the methods according to the present invention is which objects get drawn at lower levels of detail when not all objects can be drawn at the maximum level of detail. As an alternative to dropping the frame rate below the desired minimum frame rate for smooth interactivity, some of the objects may be drawn at a lesser level of detail. Any application requiring three-dimensional graphics and interactivity, such as games, or potentially e-commerce, can benefit from the methods according to the present invention.

Each level of detail is, for example, a list of polygons which represent that object. The levels of detail are usually predefined. Any given object may have only one, a few, or over a hundred predefined levels of detail. Another common way to represent an object is a parametric representation, in which each edge or curve of the object is represented by a function. The number of points plotted by the function is varied according to a parameter indicating the level of detail desired in the parametric representation.

If the developer is risky, he may decide that it is extremely important that the most important object (for example, the object in the center) be drawn at the highest level of detail, with the undesirable consequence that the appearances of objects in the background may suffer. In this case, the frame rate may fluctuate, and the visual appearances of all objects may vary.

Conversely, if the developer is risk averse or stable, he may decide that it is extremely important that the frame rate be stable. This has the side effect that none of the objects may be drawn at the best level of detail, and that the visual appearance is stable. Thus, all objects are drawn at the same level of detail from frame to frame even though the most important objects are undesirably not drawn at the highest levels of detail which would otherwise be possible.

A more general way to analyze the situation is to use an economics approach according to the present invention. Each representation has an associated value and cost. By applying a portfolio model for managing resources and risks, we provide a more powerful and more general model for determining multi-resolution model transitions.

The portfolio model provides a function for managing resource allocation against overall risk. Consider the case where one level of detail for an object is accessed (viewed) $n_a$ times in a given time interval, with a standard deviation (or risk) that is denoted by $\sigma_a$. In the same vein, the number of times that the other LOD is accessed is denoted in the same interval by $n_b$ and its associated risk by $\sigma_b$. If f is the fraction of the total amount of space that goes into displaying LOD type a, then the total expected number of hits in the given time interval will be the weighted average of the expected number of his for each LOD, i.e.

$$n=fn_a+(1-f)n_b \quad \text{(Equation A)}$$

The total risk associated with this "portfolio" of viewed levels of detail is a function of the variances associated with each, weighted by the proportions. Its analytical form is of the form $$\sigma = [f^2\sigma_a^2 + (1-f)^2\sigma_b^2 + 2f(1-f)\sigma_a\sigma_b\rho]^{1/2} \quad \text{(Equation B)}$$

where the last term denotes the covariance between the two and $\rho$ is the correlation coefficient $0 \leq \rho \leq 1$, measuring how the access pattern to one is related to the other. In the preferred embodiment, the correlation coefficient term is ignored, thus $\rho$ is set to zero. In an alternative embodiment according to the present invention, the correlation coefficient $\rho$ is computed during the processing of each frame by a standard statistical procedure. The inclusion of the correlation coefficient $\rho$ adds a some additional complexity to the computations of Equations 1 and 4 below, but does not in any way fundamentally change the methods according to the present invention. By the addition of the correlation coefficient in the alternative embodiment, the present invention attempts to induce empirically the interrelationship or dependency of the various objects in the scene.

Figure 9:
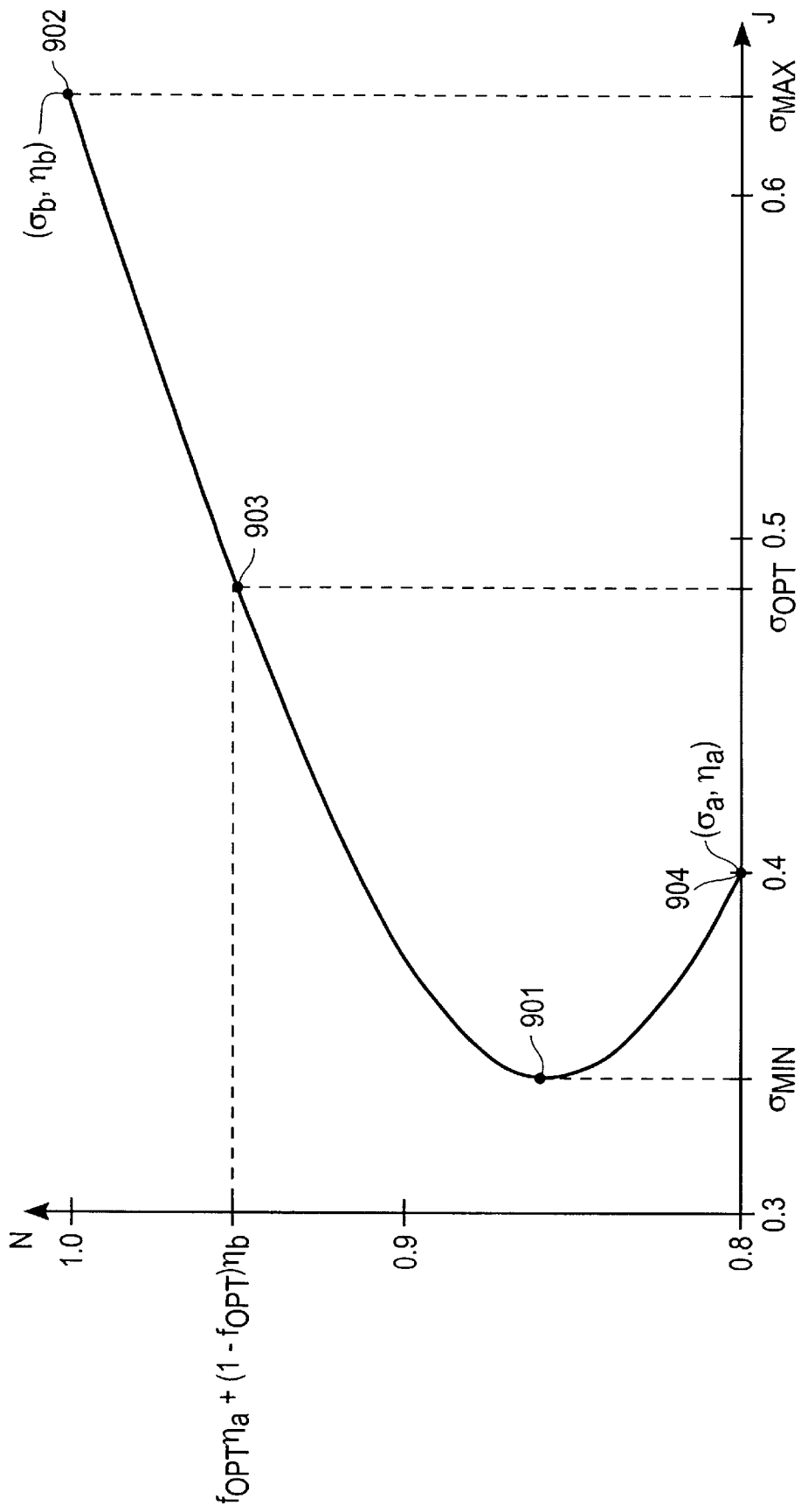
FIG. 9 illustrates a curve showing the expected hit value corresponding to leaf object and composite parent object COMP1 in the current frame as a function of the risk assumed in selecting the allocated resources for objects J and COMP1 in the scene shown in FIG. 2 based upon the histograms shown in FIG. 8 and the scene object structure shown in FIG. 4.
Figure 10:
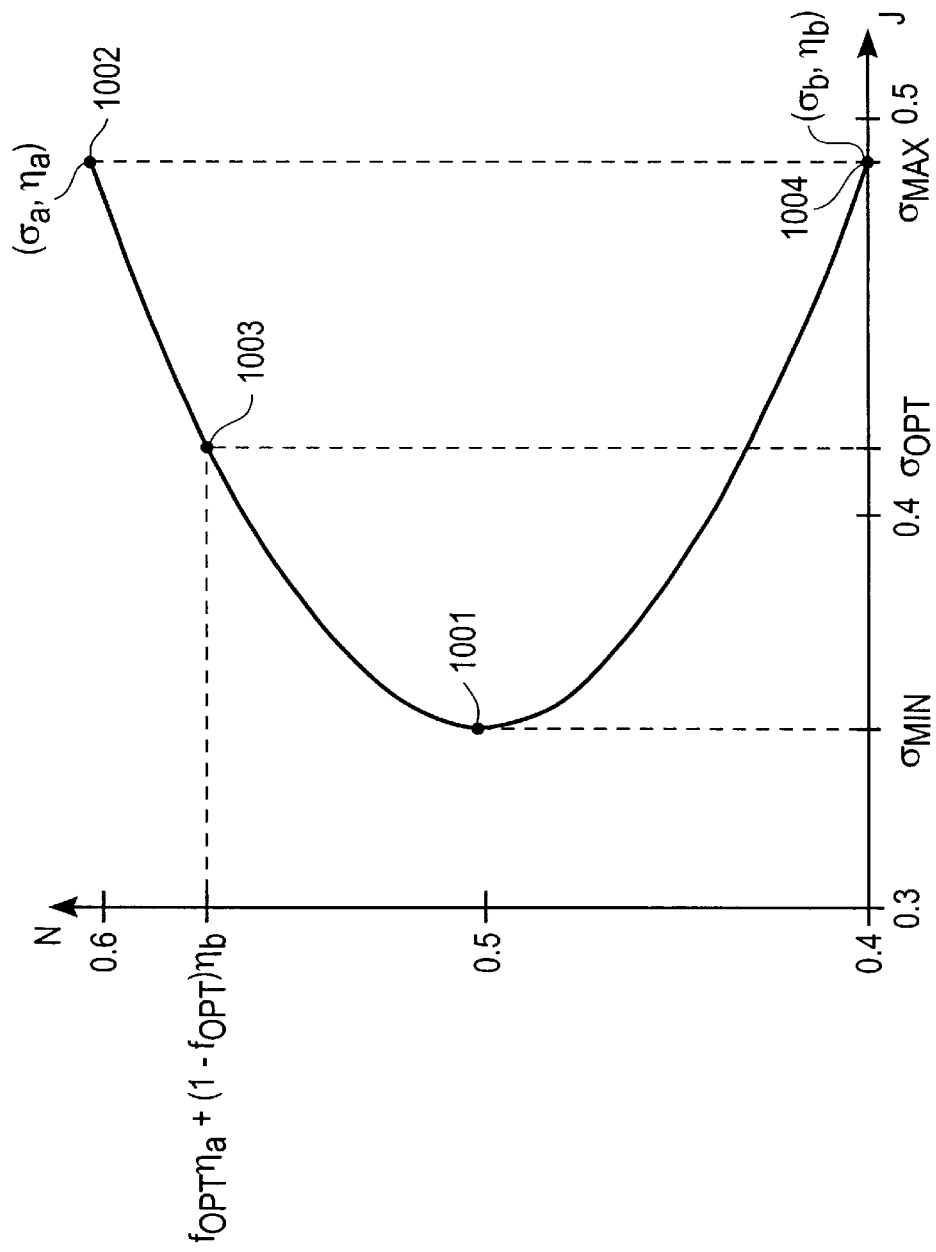
FIG. 10 illustrates a curve showing the expected hit value corresponding to leaf objects K and L as a function of the risk assumed in selecting the allocated resources for objects K and L in the scene based upon the histograms shown in FIG. 8 and the scene object structure shown in FIG. 4.

An interesting consequence of the above equations can be observed when plotting the total value for the portfolio and its risk parametrically as a function of the fraction of time allocated to the objects. If the rendering engine maxes out at 10000 polygons per frame at the desired minimum frame rate, then the total hit value n plotted along the y axis can represent the total number of polygons drawn in the frame. FIGS. 9 and 10 shows the functional dependence of expected number of hits and overall risk for the values set for an example. The upper branches of these curves correspond to the efficient allocation of resources, since they yields increasing returns with increasing risks.

The hit value used in the computations according to the present invention associated with a leaf object in a given frame may be predetermined, may be a function of its position in the scene, may be a function of a dynamic weighting algorithm, or any combination of these factors. Thus, each leaf object may have a static or dynamic importance weight associated with it. The hit value for an object in a frame may be a function of the importance weight. The hit value is monotonically related to the importance of the object in the scene. Thus, more important objects in a given frame have higher hit values.

Several interesting features of these curve are worth noticing. First, since the end points correspond to the risks associated with fully investing or divesting in either object A or object B, there is a regime to the left of the risk values $\sigma_a$ and $\sigma_b$ for which it is possible to obtain lower risk than one would get by investing space solely in one object or in the other object. The example is extended to many objects by recursively computing this curve, as described below in conjunction with FIGS. 5–7.

FIG. 1 illustrates a general purpose computer architecture 100 suitable for implementing the method according to the present invention. A processor 102 is connected to an internal bus 101 having address, data, and control lines open (not shown). Also attached to the data bus 101 is a memory device 103, such as RAM which stores program instructions executed by processor 102 as well as data which is read and/or written by the programs executed by processor 102. The general purpose computer architecture 100 also includes a display device 104, as will be discussed later in more detail. An input/output device 105 logically represents other forms of communication to and from the general purpose computer architecture such as user input from a joystick, a keyboard, or a mouse, an interface to a secondary storage device, such as a hard disk and a network interface. It is to be understood that various additional elements may also be included in the general purpose computer architecture 100, such as a graphics coprocessor (not shown).

Figure 2:
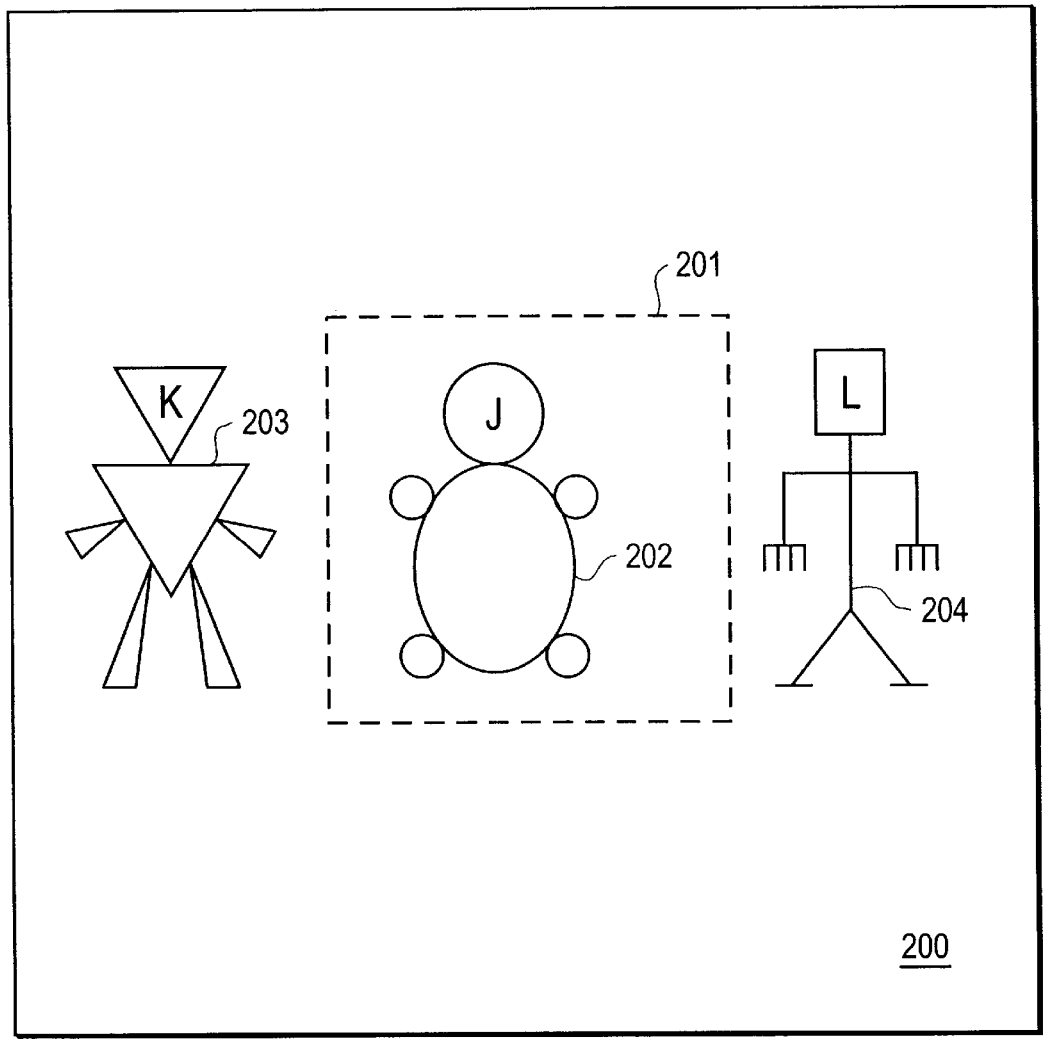
FIG. 2 illustrates a suitable display screen appearance resulting from executing the methods according to the present invention on a display scene having three leaf objects.

FIG. 2 illustrates a suitable display screen appearance resulting from executing the methods according to the present invention on a display scene having three objects. The display screen appearance 200 includes a level of detail 202 representing object J, a level of detail 203 representing object K, and a level of detail 204 representing object L. Dotted box 201 logically represents a central portion of the display screen 200. Although it is shown as a rectangle, the central portion of the display screen 200 may alternatively be defined as a circle or ellipse. The display screen appearance 200 represents an isolated frame in a sequential series of frames representing a dynamic scene such as resulting from an interactive software application, such as a video game. In such an interactive software application, a user manipulates the display screen appearance 200, for example, by moving a logical camera position in a logical three-dimensional space with a joy stick. The display screen appearance 200 represents the two-dimensional projection of the three-dimensional scene resulting from the current camera position and the current positions of the various objects in the three-dimensional environment.

An arbitrarily large number of objects may exist in the logical three-dimensional space. Depending upon the position of each object relative to the camera and the nature of each object itself, the graphical representation of each object seen in the display scene 200 may vary over time.

Figure 3B:
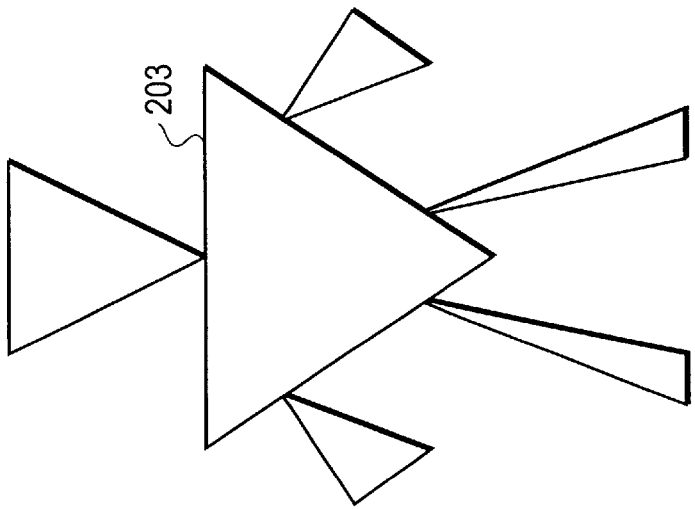
FIG. 3B illustrates a second lower level of detail which is alternatively chosen instead of the first higher level of detail shown in FIG. 3A by the methods according to the present invention for an object shown in the display scene illustrated in FIG. 2.
Figure 3A:
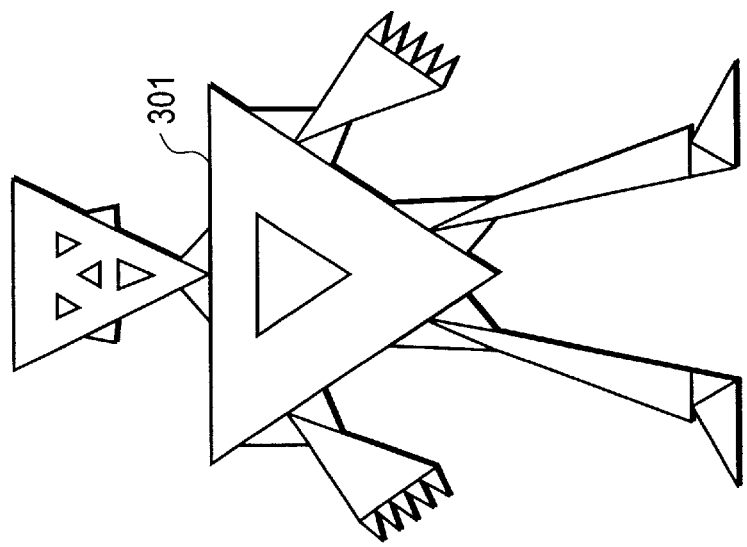
FIG. 3A illustrates a first higher level of detail which is selectively chosen by the methods according to the present invention for an object shown in the display scene illustrated in FIG. 2.

FIG. 3A illustrates a first higher level of detail which is selectively chosen by the methods according to the present invention for an object shown in the display scene illustrated in FIG. 2. This higher level of detail LOD(K1) requires 4,000 polygons of graphics resources to draw in any given frame. The first higher level of detail 301 corresponding to the object K presents more detail to the object K, and is desired when object K takes on great importance in the scene, as may be determined by any one of a variety of methods. For example, when object K is judged to be in the central portion of the display screen 201, then it may be the case that the user has manipulated the joy stick such as to place object K into the central portion 201 of the display screen, thereby directing his attention to object K. In this case, a judgment may be made that object K has great importance and should be drawn with a high level of detail 301. FIG. 3B illustrates a second lower level of detail which is alternatively chosen instead of the first higher level of detail 301 shown in FIG. 3A by the methods according to the present invention for an object shown in the display scene illustrated in FIG. 2. This second lower level of detail LOD(K2) requires 1,000 polygons to draw in any given frame. However, the level of detail 203 provides a less realistic representation of the object K.

In an interactive or real-time computing environment involving complex three-dimensional graphics, it is desirable to maintain a constant frame rate such that the maximum time between any two consecutive frames is not excessively long. Because an arbitrarily large number of objects may appear in any given display screen 200 at a certain frame, it is often not possible to draw all such objects with the highest level of detail because to do so would require too much time for the computer system 100, thereby reducing the frame rate and providing degraded choppy interactivity to the user. Thus, in order to provide a smooth frame rate and interactivity, levels of detail for the various objects are chosen such that all objects can be drawn in the predetermined maximum amount of time determined by the desired frame rate.

Figure 4:
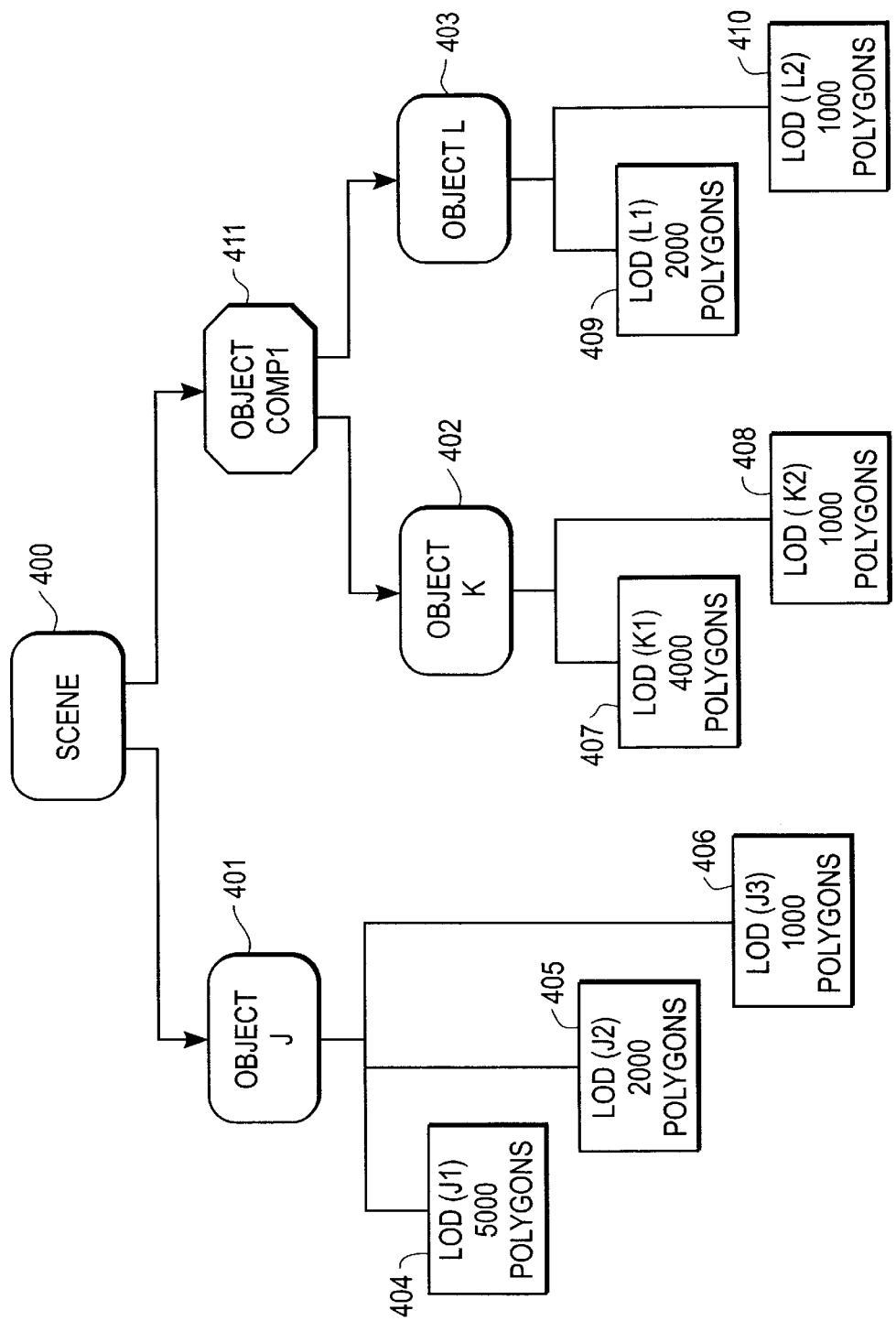
FIG. 4 illustrates the various levels of detail available for displaying the three leaf objects in the scene shown in FIG. 2, as well as showing the binary tree structure of a scene having composite parent objects.

FIG. 4 illustrates the various levels of detail available for displaying the three objects in the scene shown in FIG. 2. The scene 400 includes object J 401, object K 402, and object L 403. Object J 401 may be represented by either level of detail LOD(J1) 404, level of detail LOD(J2) 405, or level of detail LOD(J3) 406. LOD(J1) requires 5,000 polygons, LOD(J2) requires 2,000 polygons, and LOD(J3) requires only 1,000 polygons to draw in any given frame. Object K 402 may be represented by either level of detail LOD(K1) 407 or level of detail LOD(K2) 408. Level of detail LOD(K1) requires 4,000 polygons to draw in any given frame, while level of detail LOD(K2) requires only 1,000 polygons to be drawn in any given frame. Similarly, object L 403 may be represented by either level of detail LOD(L1) 409 or level of detail LOD(L2) 410. Level of detail LOD(L1) requires 2,000 polygons to draw in any given frame, while LOD(L2) requires only 1,000 polygons to be drawn in any given frame. It is to be understood that the levels of detail illustrated in FIG. 4 are for illustration purposes only.

FIG. 4 also illustrates a binary tree structure in which all scenes are preferably organized according to the present invention. Leaf objects are objects having levels of detail associated with them which represent displayable objects, such as objects J 401, K 402, and L 403 in FIG. 2. Composite parent objects have two children, such as COMP1 411 in FIG. 2. Children of composite parent objects are either leaf objects or composite parent objects. Leaf objects and composite parent objects are combined in a binary fashion until a single binary tree represented by the scene object results. A composite parent object contains both of its children and contains all objects contained by both of its children. The scene object contains all of the leaf objects in the scene. Although the binary tree representation of a scene may optionally be generated in order to carry out the methods according to the present invention, the binary tree representation is usually be produced for other purposes in the normal course executing a graphics application and consequentially utilized by the methods according to the present invention.

An object potentially may be modeled with an arbitrarily large number of different levels of detail. This would be appropriate, for example, in a video game in which a central important character appears in many contexts and at a variety of different distances from the observation point or camera. Also, it is to be noted that while the levels of detail illustrated in FIG. 4 shows a discrete number of alternatively selectable levels of detail corresponding to each object, it is possible that an object has a parametric model which can generate a level of detail from one or more input parameters. Thus, instead of being predefined as illustrated in FIG. 4, the levels of detail corresponding to any given object may alternatively be computed on the fly based upon some input parameters indicating the desired level of detail. In this way, the level of detail available for displaying any given object are more numerous, corresponding roughly to a continuous distribution of available levels of detail, rather than a small number of discretely selectable levels of detail such as shown in FIG. 4.

Figure 5:
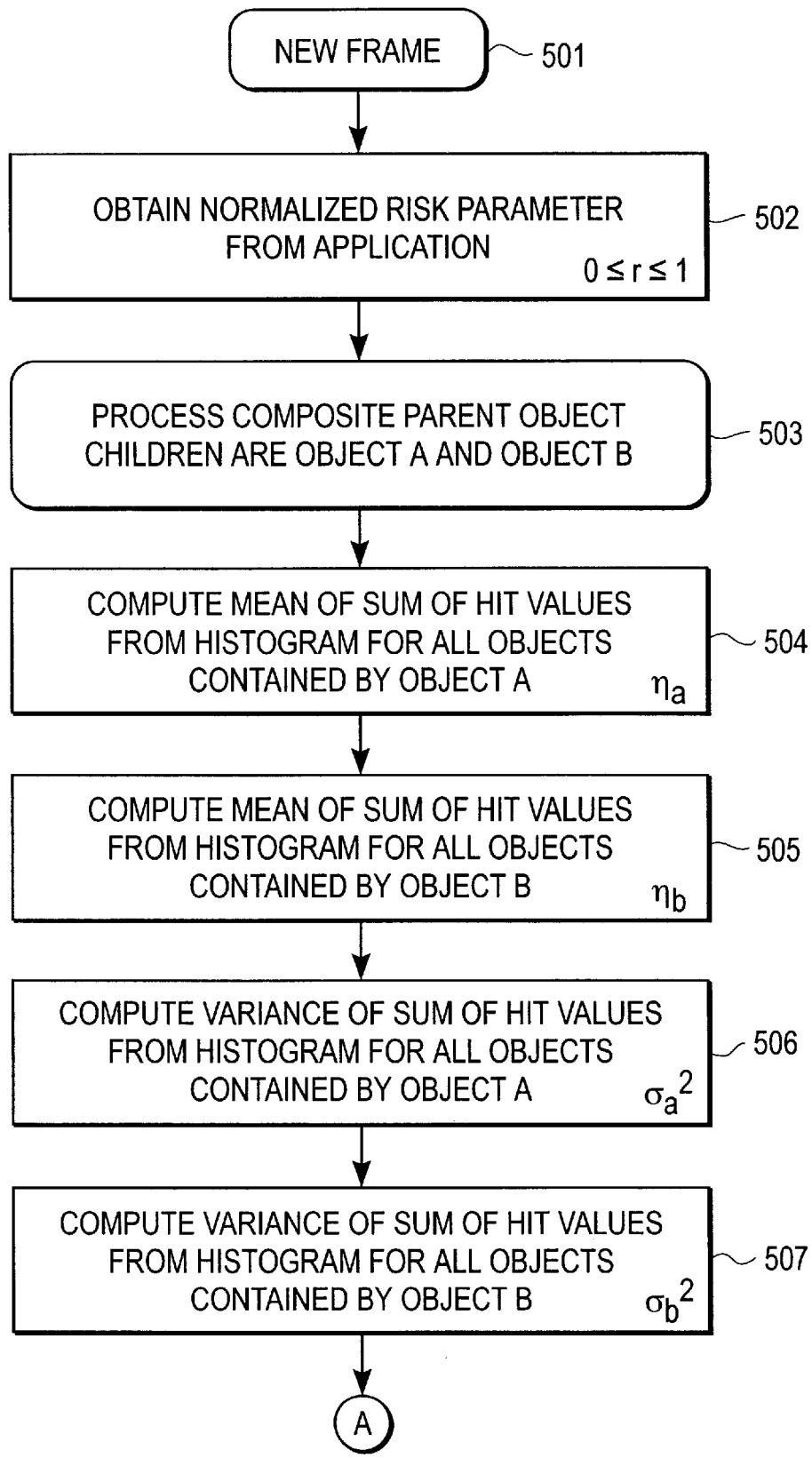
FIG. 5 illustrates a method of computing an optimal level of graphics resources to be allocated to two objects in a scene according to the present invention.

FIG. 5 illustrates a method of computing an optimal level of graphics resources to be allocated to an object in a scene according to the present invention. The method begins at step 501 by beginning the processing of a new frame. At step 502, the method obtains a normalized risk parameter from the application. Normalized risk parameter r is preferably a number between 0 and 1, inclusive, representing the amount of risk that the programmer is willing to assume in order to more fully utilize all of the graphics resources at the risk of exceeding the maximum number of polygons which can be drawn by the computer 100 in the predetermined time allocated to each frame. Thus, if r is 1, the application programmer has decided that fully utilizing the maximum amount of graphics resources is desired regardless of the interactive smoothness delivered to the user. Here, the interactive smoothness refers to the frame rate and the continuity from frame to frame of the level of detail selected for each object in the scene.

It is generally desirable to maintain the same level of detail from frame to frame for any given object so as to make a minimum number of transitions from level of detail to another level of detail for an object when a discrete number of levels of detail are available to display each object such as illustrated in FIG. 4. Otherwise, undesirable flickering of the object appears to the user over consecutive frames as the object is displayed with alternating levels of detail in each consecutive frame.

A normalized risk parameter of 0 indicates that interactive smoothness or stability is desired above all, without regard for whether or not important objects are drawn with high levels of detail and without regard for the full utilization of the available graphics resources. In other words, a constant frame rate and continuity of level of detail for each object is supremely important when the normalized risk parameter r is 0. According to the present invention, the normalized risk parameter r may take on any value between 0 and 1 inclusive. Normalized risk parameter r may vary from frame to frame as desired by the application.

In the event that the binary tree is computed by the method according to the present invention, the importance rankings of the objects may be used in determining the structure of the binary tree. For example, to simulate a greedy algorithm, the most important object is made a child of the scene object and all other objects are contained by the sibling (a composite parent object) of the most important object. In this greedy algorithm case, each composite parent a leaf object child and another composite parent object child except the deepest composite parent object, which has the two least important objects as children. In an embodiment of the present invention, the importance ranking of the objects is determined from the histograms of the hit values associated with the objects. In other words, the object having the highest average hit value over the predetermined number of frames is the most important object. The determination of the importance ranking of each object in the display scene is optional in the sense that the method according to the present invention can recursively process the various objects in the scene in any arbitrary order. However, it is generally desirable to process the objects in their order of importance, such that the most important object is processed first followed by the second most important object and so on until all objects have been processed. In this way, the maximum amount of graphics resources is available to be allocated to the most important object if necessary. The importance ranking of the objects in the scene may be determined by any one of a variety of methods. For example, the importance ranking may be predetermined based upon the object itself, may alternatively be a function of a number of times that the object has appeared in previous frames, or may be a function of the amount of graphics resources used by the object in previous frames.

After step 502 has finished, the method continues to invoke the composite parent object process (steps 503 through 707) on the scene object, such as scene object 400 in FIG. 4. The scene object has no parent and contains all leaf objects having levels of detail.

Figure 7:
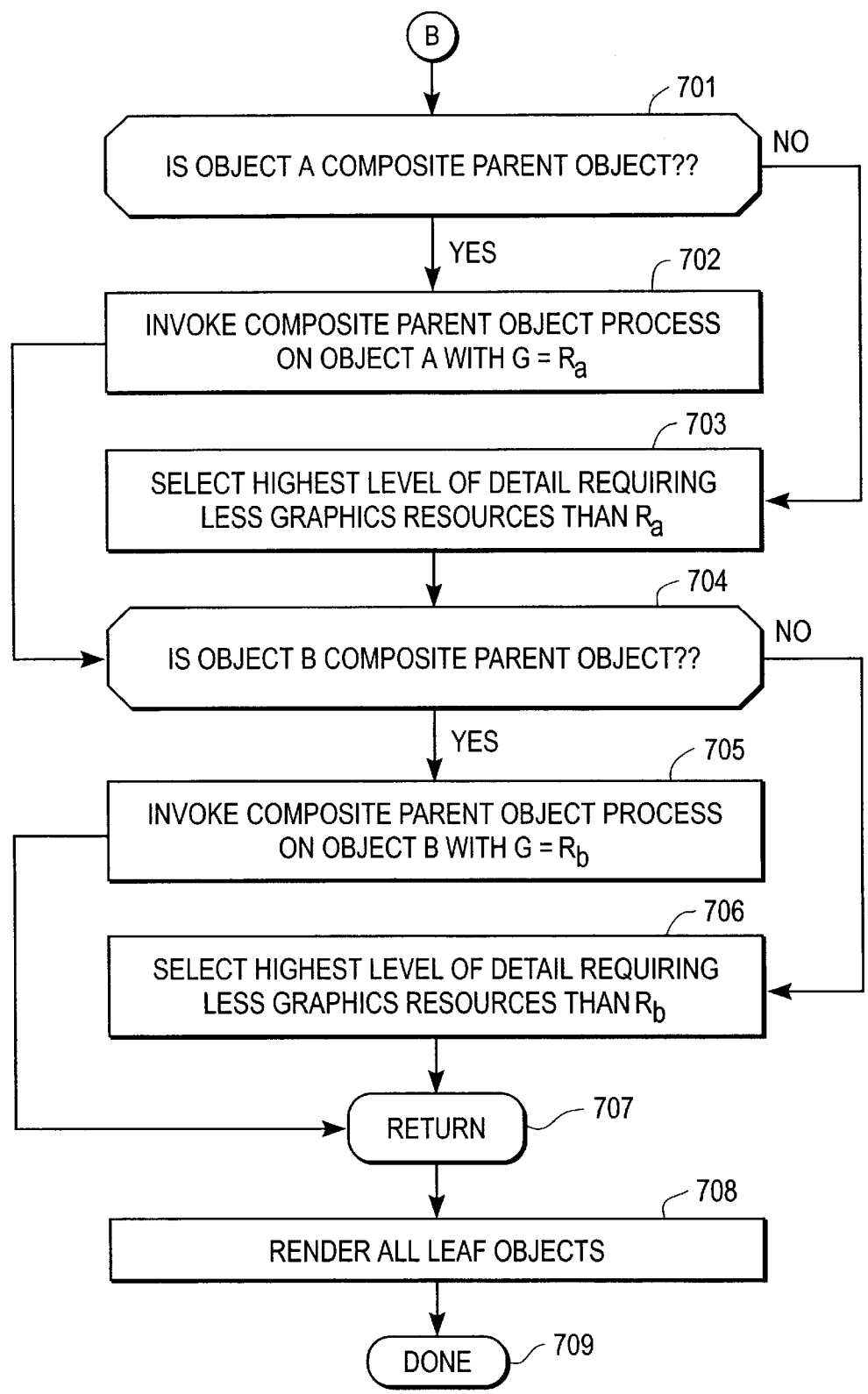
FIG. 7, along with FIGS. 5 and 6, illustrates a method for the recursive selection of the levels of detail for each leaf object in a scene according to the present invention.

Step 503 represents the recursive instantiation of the processing of a composite parent object. Thus, all the steps between the invocation at step 503 and the return at step 707 in FIG. 7 represent the processing of a composite parent object. As stated above, a composite parent object may have two leaf objects with levels of detail, two composite parent objects containing four or more leaf objects, or one leaf object and one composite parent object. When step 503 is invoked, for the purposes of carrying out the method described between steps 503 and 707, one child of the composite parent object is deemed "object A" and the other child is deemed "object B" regardless of its actual name.

In the preferred embodiment, at step 504 the mean of the sum of the hit value for all the leaf objects contained by object A is computed from a histogram of the previous hit values for those objects in a predetermined number of immediately previous consecutive frames. This mean hit value $n_a$ is computed by the standard statistical definition of mean, which is the average hit value.

At step 505, the mean of the sum of the hit values for the leaf objects contained in object B is computed by the standard statistical definition. In other words, the hit values for the leaf objects contained in object B are added together in each frame, and a list of the resulting sums is stored such that there is one sum for each frame in the predetermined previous time period. The mean of this list of sums is computed as $n_b$.

At step 506, the variance $\sigma_a^2$ of the hit value for object A is computed from the histogram. The variance $\sigma_a^2$ is the standard statistical variance, which is computed by averaging the squares of the differences between the actual hit values during each frame from the mean hit value for all frames in the histogram.

At step 507, the variance $\sigma_b^2$ of the sum of the hit values for object B is computed from the list of sum of hit values described in conjunction with step 505 by averaging the squares of the differences between the actual sum of hit values during each frame from the mean sum of hit values for all frames in the histogram.

Figure 6:
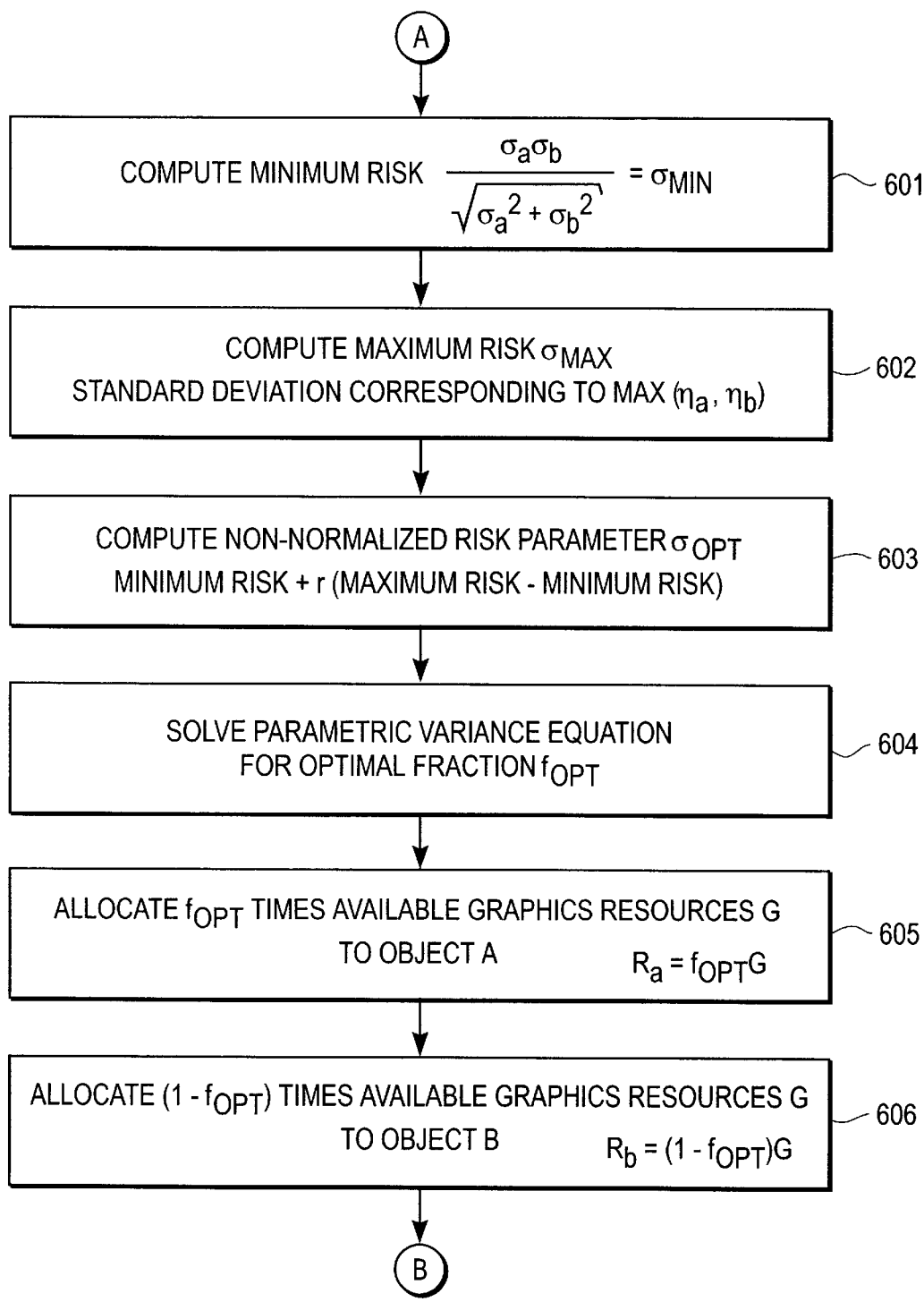
FIG. 6 is a continuation of FIG. 5 which illustrates a method of computing optimal levels of graphics resources to be allocated to two objects in a scene according to the present invention.

FIG. 6 is a continuation of FIG. 5 which illustrates a method of computing an optimum level of graphics resources to be allocated to an object in a scene according to the present invention. At step 601, the minimum risk $\sigma_{MIN}$ is computed as shown in Equation 1.

$$\sigma_{\text{MIN}} = \frac{\sigma_a \sigma_b}{\sqrt{\sigma_a^2 + \sigma_b^2}} \quad \text{(Equation 1)}$$

At step 602, the maximum risk $\sigma_{MAX}$ is computed by selecting the standard deviation corresponding to the higher value of $n_a$ or $n_b$ as shown in Equation 2.

$$\sigma_{\text{MAX}} = \begin{cases} \sigma_a & \text{if } n_a \geq n_b \\ \sigma_b & \text{if } n_b > n_a \end{cases} \quad \text{(Equation 2)}$$

Step 602 basically determines that the maximum risk will correspond to allocating all the remaining resources to object A if object A has a higher average hit value than object B, or alternatively, the maximum risk $\sigma_{MAX}$ will correspond to allocating all the remaining graphics resources to object B if the sum of the hit values contained by object B is greater than the sum or the hit values for contained by object A. Thus, the maximum risk $\sigma_{MAX}$ will correspond to the allocation of all the graphics resources in a way that maximizes the total expected hit value as described by Equation A.

Step 603 computes the non-normalized risk parameter $\sigma_{OPT}$ as shown by Equation 3.

$$\sigma_{OPT} = \sigma_{MIN} + r(\sigma_{MAX} - \sigma_{MIN}) \quad \text{(Equation 3)}$$

In other words, step 603 linearly maps the normalized risk parameter r to the range bounded by the minimum risk $\sigma_{MAX}$ and the maximum risk $\sigma_{MAX}$. Thus, if r is 0 then the non-normalized risk parameter $\sigma_{OPT}$ is the minimum risk $\sigma_{MIN}$ and if the normalized risk parameter r is 1, then the non-normalized risk parameter $\sigma_{OPT}$ is the maximum risk $\sigma_{MAX}$. At step 604, the method substitutes the non-normalized risk parameter $\sigma_{OPT}$ into the parametric variance equation B above. In the preferred embodiment, the correlation term $\rho$ in the parametric variance Equation B is ignored, thus it is assumed that the hit values corresponding to $n_a$ and $n_b$ are independent. At step 604, the parametric variance equation is solved for the optimal fraction $f_{OPT}$ of the remaining graphics resources to be allocated to object A as described by Equation 4.

$$f_{OPT} = \begin{cases} \dfrac{\sigma_b^2 + \sqrt{\sigma_{OPT}^2(\sigma_a^2 + \sigma_b^2) - \sigma_a^2 \sigma_b^2}}{\sigma_a^2 + \sigma_b^2} & \text{if } n_a \geq n_b \\ \dfrac{\sigma_b^2 - \sqrt{\sigma_{OPT}^2(\sigma_a^2 + \sigma_b^2) - \sigma_a^2 \sigma_b^2}}{\sigma_a^2 + \sigma_b^2} & \text{if } n_b > n_a \end{cases} \quad \text{(Equation 4)}$$

Because the parametric variance Equation B is a quadratic equation with respect to the optimal fraction $f_{OPT}$, it has two solutions. The solution that corresponds to the highest expected hit value as indicated by Equation A is chosen as the optimal fraction $f_{OPT}$. At step 605, the method allocates the optimal fraction $f_{OPT}$ times the available graphics resources G to object A. The allocated resources $R_a$ may be in terms of polygons or some other hit value metric. At step 606, the method allocates $(1-f_{OPT})$ times the available graphics resources G to object B. Thus, all of the available graphics resources G are allocated to objects A and B.

FIG. 7, along with FIGS. 5 and 6, illustrates the method for the recursive selection of the levels of detail for each object in a scene according to the present invention. At step 701, the method determines if object A is a composite parent object. If so, the method invokes another recursive instantiation of the composite parent object process beginning at step 503 and continuing until step 707. Thus, if object A is not a leaf object, step 702 processes the binary tree beneath object A. The amount of available graphics resources G for the recursive instantiation is equal to the amount of graphics resources allocated $R_a$ to composite parent object A. In other words, all the leaf objects contained by object A will divide up the graphics resources $R_a$ allocated to object A. If object A is a leaf object (and thus not a composite parent object), the level of detail for object A is selected at step 703 based upon the allocated resources $R_a$ allocated to that object. Step 703 can be accomplished in any one of a variety of methods according to the present invention. For example, in the preferred embodiment, the level of detail selected is chosen as the highest level of detail for which the required graphics resources do not exceed the resources allocated $R_a$ for that object. If no level of detail exists for the object which does not exceed the resources allocated $R_a$ for that object, then the object is culled from the scene. As another example, the level of detail selected for object A can alternatively be the level of detail for which the required graphics resources are arithmetically closest to the allocated resources $R_a$.

After either the recursive instantiation of the composite parent object process invoked by step 702 has returned (in the case that object A was a composite parent object) or after the level of detail for object A is selected at step 703 (in the case that object A was a leaf object), the method progresses to step 704.

At step 704, the method determines if object B is a composite parent object. If so, the method invokes another instantiation of the composite parent object process beginning at step 503 and continuing until step 707. Thus, if object B is not a leaf object, step 705 processes the binary tree beneath object B. The amount of available graphics resources G for the recursive instantiation is equal to the amount of graphics resources allocated $R_b$ to composite parent object B. In other words, all the leaf objects contained by object B will divide up the graphics resources $R_b$ allocated to object B. If object B is a leaf object (and thus not a composite parent object), the level of detail for object B is selected at step 706 based upon the allocated resources $R_b$ allocated to that object in the same manner as described above with reference to the selection of the level of detail for object A.

After either the recursive instantiation of the composite parent object process invoked by step 705 has returned (in the case that object B was a composite parent object) or after the level of detail for object B is selected at step 706 (in the case that object B was a leaf object), the method returns from the recursive instantiation of the composite parent object process (steps 503 through 707) to continue in the processing of object B's parent.

In the case that the return 707 is to the invocation of the composite parent object instantiated after step 502 and corresponding to the scene object (such as 400 in FIG. 4) containing all leaf objects in the scene, then the method progresses to step 708 to render all objects because levels of detail have been selected for all leaf objects. As described above, in the cases that the return 707 is to the recursive invocation of the composite parent object process corresponding to object A instantiated by step 702 or is to the recursive invocation of the composite parent object process corresponding to object B instantiated by step 705, then the return 707 is to the portion of the object's parent process from which it was invoked. In this sense, steps 503 through 707 represent a recursive method which is invoked at the highest level after step 502 on the scene object, and which is recursively invoked at lower levels by its own steps 702 and 705. Levels of detail have been selected by for all objects after the recursive method has returned form the highest level invocation on the scene object. Thus, at step 708, all objects are rendered.

FIG. 8 illustrates histograms of the appearance in the center of the display screen over the previous ten frames in the scene of the leaf objects displayed in FIG. 2 suitable for computing the statistics required to perform the methods according to the present invention. In the immediately previous frame, object J was in the center of the display screen 200 and objects K and L were not in the center of the display screen. In the frame six frames ago, all objects J, K, and L were in the center 201 of the display screen 200. Thus, in FIG. 8 a 1 represents the appearance of the object in the center 201 of the display screen, while a 0 represents the absence of the object from the center of the display screen 200. The binary values shown in FIG. 8 are directly interpreted as hit values in the context of the method illustrated in FIGS. 5 through 7 of determining the levels of detail for objects J, K, and L in the current frame.

In the preferred embodiment, the hit values used for leaf objects according to the present invention are binary values showing the presence or absence of the leaf object in the center of the display screen, and the hit value corresponding to a composite parent object is computed by adding the hit values of all the leaf objects that it contains. In an alternative embodiment with binary values, the hit value corresponding to a composite parent object is the logical "or" of the hit values of all the leaf objects that it contains. In another alternative embodiment with binary values, the hit value corresponding to a composite parent object is the logical "and" of the hit values of all the leaf objects that it contains. In other words, in these alternatives, all leaf objects and composite parent objects have hit values of either 0 or 1. Thus, steps 504 and 507 illustrate the preferred embodiment rather than these alternative embodiments.

The hit values for objects A and B are deemed the "primary hit value" and the "secondary hit value" in the context of the present invention, regardless of whether or not objects A and B are both leaf objects, both composite parent objects, or one leaf object and one composite parent object. In the event that one of objects A and B is a leaf object and the other of objects A and B is a composite parent object, then for the purposes of describing the methods of the present invention, the primary hit values are deemed to be the hit values corresponding to the leaf object, and the secondary hit values are deemed to be the hit values corresponding to the composite parent object. This terminology applies regardless of which of the alternative manners of determining the hit values for leaf objects and composite parent objects is used.

FIG. 9 illustrates a curve showing the expected hit value corresponding to all objects in the current frame as a function of the risk assumed in selecting the allocated resources for object A (object J) in the scene shown in FIG. 2 based upon the histogram shown in FIG. 8. The point 901 corresponds to the minimum risk $\sigma_{MIN}$ while the point 902 corresponds to the maximum risk $\sigma_{MAX}$.

Table 1 below illustrates a concrete example of the execution of the method according to the present invention of selecting the level of detail based upon the histogram shown in FIG. 8 for the display screen appearance 200 shown in FIG. 2 for the levels of detail shown in FIG. 4. Line 1 at Table 1 shows that the normalized risk parameter for this example is 0.5. Line 2 shows the invocation of the composite parent object process on the scene object 400. For the purposes of the highest level invocation of the composite parent object process, object A is leaf object J 401, while object B is composite parent object COMP1 411. Line 3 shows the mean hit value for object J which is computed by taking the average of the hit values shown in column 801 of FIG. 8. Line 4 indicates that the mean sum of the hit values for objects K and L is the average of the sum of the values in columns 802 and 803 of FIG. 8. Line 5 shows the variance for object J. Line 6 shows the variance for objects K and L. As discussed above, both the mean sum of hit values for objects K and L $(n_b)$ and the variance for objects K and L $(\sigma_b^2)$ are computed from a list of the sum of the hit values for objects K and L during the ten previous frames. In the example shown in FIG. 8, the sums of the hit values for objects K and L over the previous ten frames are 0, 1, 0, 1, 1, 2, 1, 2, 1 and 1, in reverse chronological order. Line 7 shows the minimum risk $\sigma_{MIN}$ computed by Equation 1 and illustrated by the point 901 in FIG. 9. Line 8 shows the maximum risk $\sigma_{MAX}$ computed by Equation 2 and shown by the point 902 in FIG. 9. Line 9 shows the non-normalized risk parameter $\sigma_{OPT}$ computed by Equation 3 and illustrated by the point 903 in FIG. 9. Line 10 shows the optimal fraction $f_{OPT}$ computed by Equation 4. The optimal fraction $f_{OPT}$ represents the optimal amount of graphics resources to be allocated to object J in the scene. Line 11 shows the total graphics resources for the computer system 100 during the current frame. The available graphics resources for the example illustrated here is 10,000 polygons which can be drawn by the computer system 100 in the predetermined time period corresponding to the desired frame rate. Line 12 shows that the resources allocated for the object J ($R_a$) is the product of the optimal fraction $f_{OPT}$ times the remaining resources shown in line 11. Line 13 shows that the level of detail LOD(J2) is selected for displaying object J because the number of polygons required to display the level of detail LOD(J2) is 2,000 polygons shown by element 405 in FIG. 4. This is the highest level of detail for object J which does not exceed the resources allocated $R_a$ for object J. Line 14 shows the invocation of the composite parent object process on the composite parent object COMP1 411 instantiated by step 705.

TABLE 1

| | |
|---|---|
| 1) Normalized Risk Parameter (r) (step 502) | 0.5 |
| 2) Invoke Composite Parent Object Process On Scene Object With G = 10000 (step 503) | Children J and COMP1 |
| 3) Mean Hit Value for Object J ($n_a$) (step 504) | 0.8 |
| 4) Mean Sum of Hit Values for Objects K and L ($n_b$) (step 505) | 1.0 |
| 5) Variance for Object J ($\sigma_a^2$) (step 506) | 0.16 |
| 6) Variance for Objects K and L ($\sigma_b^2$) (step 507) | 0.4 |
| 7) Minimum Risk ($\sigma_{MIN}$) (step 601) | 0.338 |
| 8) Maximum Risk ($\sigma_{MAX}$) (step 602) | 0.632 |
| 9) Non-Normalized Risk Parameter ($\sigma_{OPT}$) (step 603) | 0.485 |
| 10) Optimal Fraction ($f_{OPT}$) (step 604) | 0.249 |
| 11) Available Graphics Resources G | 10000 |
| 12) Resources Allocated for Object J ($R_a$) (step 605) | 2490.857 |
| 13) Level of Detail for Object J (step 703) | LOD(J2) |
| 14) Resources Required for LOD(J2) | 2000 |
| 15) Invoke Composite Parent Object Process On Object COMP1 With G = 7509.143 (step 705) | Children K and L |
| 16) Mean Hit Value for Object K ($n_a$) (step 504) | 0.6 |
| 17) Mean Hit Value for Object L ($n_b$) (step 505) | 0.4 |
| 18) Variance for Object K ($\sigma_a^2$) (step 506) | 0.24 |
| 19) Variance for Object L ($\sigma_b^2$) (step 507) | 0.24 |
| 20) Minimum Risk ($\sigma_{MIN}$) (step 601) | 0.346 |
| 21) Maximum Risk ($\sigma_{MAX}$) (step 602) | 0.490 |
| 22) Non-Normalized Risk Parameter ($\sigma_{OPT}$) (step 603) | 0.418 |
| 23) Optimal Fraction ($f_{opt}$) (step 604) | 0.838 |
| 24) Available Graphics Resources G | 7509.143 |
| 25) Resources Allocated for Object K ($R_a$) (step 605) | 6293.025 |
| 26) Level of Detail for Object K (step 703) | LOD(K1) |
| 27) Resources Required for LOD(K1) | 4000 |
| 28) Resources Allocated for Object L ($R_b$) (step 606) | 1216.118 |
| 29) Level of Detail for Object L (step 706) | LOD(L2) |
| 30) Resources Required for LOD(L2) | 1000 |

FIG. 9 shows the various levels of risk and expected hit value return which could have possibly been chosen. FIG. 9 plots the total expected hit value defined by Equation A on the y axis and plots the risk σ determined by Equation B on the x axis. The method according to the present invention only selects points on the curve shown in FIG. 9 between point 901 and 902 inclusive. This portion of the curve is the portion in which increasing returns are experienced for incurring increasing risks. Conversely, the method according to the present invention never selects allocations of resources corresponding to points on the curve between points 901 and 904, for which decreasing returns are received for incurring increasing risks.

Similarly, FIG. 10 shows the total expected number of hits plotted against the risk assumed for the selection of the optimal resources allocated to object K by the method according to the present invention based upon the hit values shown in FIG. 8. Lines 16–27 of Table 1 above show the various intermediate computations required in determining the level of detail for object K based upon carrying out the steps 504 through 703 illustrated in FIGS. 5–7. Again, point 1001 in FIG. 10 illustrates the minimum amount of risk possible to assume while point 1002 shows the maximum amount of risk possible to assume. Point 1003 corresponds to the optimal non-normalized risk parameter $\sigma_{OPT}$. Equation 4 guarantees that only points between point 1001 and 1002 are chosen according to the present invention. Points between point 1001 and 1004 are never chosen according to the present invention because they correspond to decreasing returns obtained from increasing risks. In FIG. 10, because $n_a$ was greater than $n_b$, point 1002, which represents the maximum number of total hit value achievable, is obtained by selecting an f value of 1. Referring back to FIG. 9, this contrasts with the determination of the allocation of resources for object J, because in FIG. 9, $n_b$ was greater than $n_a$, and therefore point 9002 corresponding to the maximum total hit value achievable was obtained by selecting an f value of 0. The optimal fraction $f_{OPT}$ therefore was determined by the lower branch of Equation 4 in FIG. 9, and by the upper branch of Equation 4 in FIG. 10.

Lines 28 through 30 of Table 1 show the intermediate computations involved in determining the level of detail for the object L 204 shown in the display scene 200 resulting from steps 704 and 706.

FIG. 11 illustrates histograms of alternative hit values for three objects over the previous eight frames suitable for computing the statistics required to perform the methods according to the present invention. In an embodiment, these hit values are determined by importance of the objects as measured by some criteria. In another embodiment, these hit values represent polygon counts used to display the objects during previous frames. Thus, for example the object L was deemed to have high importance by some criteria during each of the five previous frames as indicated by its hit value of 5000. Object K was absent or deemed not important in the previous two frames. Object J was determined to have importance 2000 during each of the previous two frames. These hit values shown in FIG. 11 corresponding to each object in each of the previous eight frames are then used for the purposes of carrying out steps 503 through 707 in determining the level of detail for each of the objects L, K, and J in the current scene.

Table 2 below shows the various intermediate calculations involved in determining the levels of detail for objects J, K, and L in the scene based upon the hit values shown in FIG. 11. For the purposes of the example in Table 2, the normalized risk parameter r for the current frame is 0.2. As shown in lines 13, 26, and 29, the levels of detail chosen for objects J, K, and L are LOD(J2), LOD(K2), and LOD(L1), respectively.

TABLE 2

| | |
|---|---|
| 1) Normalized Risk Parameter (r) (step 502) | 0.2 |
| 2) Invoke Composite Parent Object Process On Scene Object With G = 10000 (step 503) | Children J and COMP1 |
| 3) Mean Hit Value for Object J ($n_a$) (step 504) | 425 |
| 4) Mean Sum of Hit Values for Objects K and L ($n_b$) (step 505) | 5375 |
| 5) Variance for Object J ($\sigma_a^2$) (step 506) | 204375 |

TABLE 2-continued

| | |
|---|---|
| 6) Variance for Objects K and L ($\sigma_b^2$) (step 507) | 484375 |
| 7) Minimum Risk ($\sigma_{MIN}$) (step 601) | 379.118 |
| 8) Maximum Risk ($\sigma_{MAX}$) (step 602) | 695.971 |
| 9) Non-Normalized Risk Parameter ($\sigma_{OPT}$) (step 603) | 500.857 |
| 10) Optimal Fraction ($f_{OPT}$) (step 604) | 0.309 |
| 11) Available Graphics Resources G | 10000 |
| 12) Resources Allocated for Object J ($R_a$) (step 605) | 3088.824 |
| 13) Level of Detail for Object J (step 703) | LOD(J2) |
| 14) Resources Required for LOD(J2) | 2000 |
| 15) Invoke Composite Parent Object Process On Object COMP1 With G = 6911.176 (step 705) | Children K and L |
| 16) Mean Hit Value for Object K ($n_a$) (step 504) | 1875 |
| 17) Mean Hit Value for Object L ($n_b$) (step 505) | 3500 |
| 18) Variance for Object K ($\sigma_a^2$) (step 506) | 2859375 |
| 19) Variance for Object L ($\sigma_b^2$) (step 507) | 4000000 |
| 20) Minimum Risk ($\sigma_{MIN}$) (step 601) | 1291.288 |
| 21) Maximum Risk ($\sigma_{MAX}$) (step 602) | 2000 |
| 22) Non-Normalized Risk Parameter ($\sigma_{OPT}$) (step 603) | 1433.031 |
| 23) Optimal Fraction ($f_{opt}$) (step 604) | 0.346 |
| 24) Available Graphics Resources G | 6911.176 |
| 25) Resources Allocated for Object K ($R_a$) (step 605) | 2767.016 |
| 26) Level of Detail for Object K (step 703) | LOD(K2) |
| 27) Resources Required for LOD(K2) | 1000 |
| 28) Resources Allocated for Object L ($R_b$) (step 606) | 4144.160 |
| 29) Level of Detail for Object L (step 706) | LOD(L1) |
| 30) Resources Required for LOD(L1) | 2000 |

It is to be understood that the normalized risk parameter r may be varied by the application from frame to frame according to the present invention. For example, the application might decide to increase the normalized risk parameter from 0 to 1 slowly over a period of one hundred frames. As another example, the risk parameter might be changed abruptly at the transition frame between two visually discontinuous scenes or at any frame during a continuous scene.

When rendering 3D objects to the screen, often a z-buffer is used to sort the objects from back to front. If the z-buffer is not deep enough, then distant objects might be culled from the scene if the z-buffer does not display objects past the maximum z-buffer depth. If the z-buffer is not finely-grained, then objects are that are nearly the same distance from the camera will appear as being exactly the same distance. This will cause shimmering as one object or the other gets drawn. The z-buffer is analogous to a set of slots from the camera to some specified distance (z-buffer depth). If the distance is far, then the granularity is not very good. If the distance is close, then the granularity is good. Developers must adjust the z-buffer distance to make sure all object are in the scene, but no shimmering occurs. Sometimes there is no good solution for all objects, and the developer must decide if the which object will suffer.

The present invention uses a "portfolio" method which describes a fundamental technique for helping the developer automatically and continuously analyze the utility of the objects in the scene to decide where the granularity effect is likely to occur, and to adjust the z-buffer based on the importance and volatility of the objects.

The z-buffer has a finite number of discrete spaces. The first space represents objects closest to the observation point, and the last space represents objects furthest from the observation point. If the rendering engine is drawing a logical space representing the galaxy, then each z-buffer location needs to be calibrated to represent a distance within the logical three-dimensional space on the order of light-years. However, if the rendering engine is drawing a logical space representing molecules, then each z-buffer location needs to be calibrated so as to represent a distance within the logical three-dimensional space on the order of nanometers.

However, if a scene includes both galaxies and molecules, then a decision must be made as to which objects are more important. It is impossible to divide the z-buffer space into distances of nanometers and then to draw enough of the spaces to reach to the galaxies. Similarly, it is impossible to divide the z-buffer space into distances of light-years without the molecules all being grouped into the same z-buffer slot and thereby destroying the molecules z-dimensional independence.

When different objects are grouped into the same z-buffer slot and exist at the same x and y pixel locations, then the object drawn into the z-buffer last will appear to be in front of the other object even if it is not in front of the other object in the logical three-dimensional space. Even worse, if the draw order of the two objects varies from frame to frame, undesirable flickering between the two objects will result from frame to frame. The z-buffer is used by the rendering engine to determine which pixels to turn on when two pixels overlap. The z-buffer is partitioned into linear slots, where each slot represents the same distance in the three-dimensional space.

To protect against z-buffer adjustment thrashing, developers should take into account the volatility of the object. The present invention introduces an economics approach—a portfolio model—to aid in this decision making. According to the present invention, the importance of the objects in determining the z-buffer calibration is adjusted from frame to frame. The portfolio model provides a procedure for managing resource allocation against overall risk. Specifically the present invention applies it to the case of space in the z-buffer when the position of an object in the screen fluctuates in time. Consider the case where an object has a hit value $n_a$ in a given time interval, and its value for purposes of the z-buffer calibration computation is $u_a d_a$, which is a function of its position with respect to the observer. The frequency with which it appears at a given spot fluctuates with a standard deviation (or risk) that we'll denote by $\sigma_a$. In the same vein, the hit value of a different object b in the same interval is $n_b$, and its value for purposes of the z-buffer calibration is denoted by $u_b d_b$, which is a function of its position with respect to the observer. The standard deviation of its frequency of appearance is denoted by $\sigma_b$. If f is the weight associated to object A in the z-buffer calibration then the total expected hit value n in the given time interval will be the weighted average of the expected value for each object, i.e.

$$n = f n_a + (1-f) n_b \qquad \text{(Equation A)}$$

The total risk associated with this "portfolio" of resource allocation is a function of the variances associated with each, weighted by the proportions. Its analytical form is of the form $$\sigma = [f^2 \sigma_a^2 + (1-f)^2 \sigma_b^2 + 2f(1-f) \sigma_a \sigma_b \rho]^{1/2} \qquad \text{(Equation B)}$$

where the last term denotes the covariance between the two and ρ is the correlation coefficient $0 \leq \rho \leq 1$, measuring how the access pattern to one is related to the other.

An interesting consequence of the above equations can be observed when plotting the total value for the portfolio and its risk parametrically as a function of the fraction of the weighting for the z-buffer influence of object A.

FIGS. 9 and 10 show the functional dependence of the expected value and overall risk. The upper branches of the curves corresponds to the efficient allocation of resources, since they yield increasing returns with increasing risks.

Several interesting features of these curves are worth noticing. First, since the end points correspond to the risks associated with the influence of only one of either object, there is a regime to the left of the values of $\sigma_a$ and $\sigma_b$ for which it is possible to obtain lower risk than would be achieved by investing resources solely in one object. These examples can be extended to many objects by recursively computing this curve, as fully described below.

Figure 12:
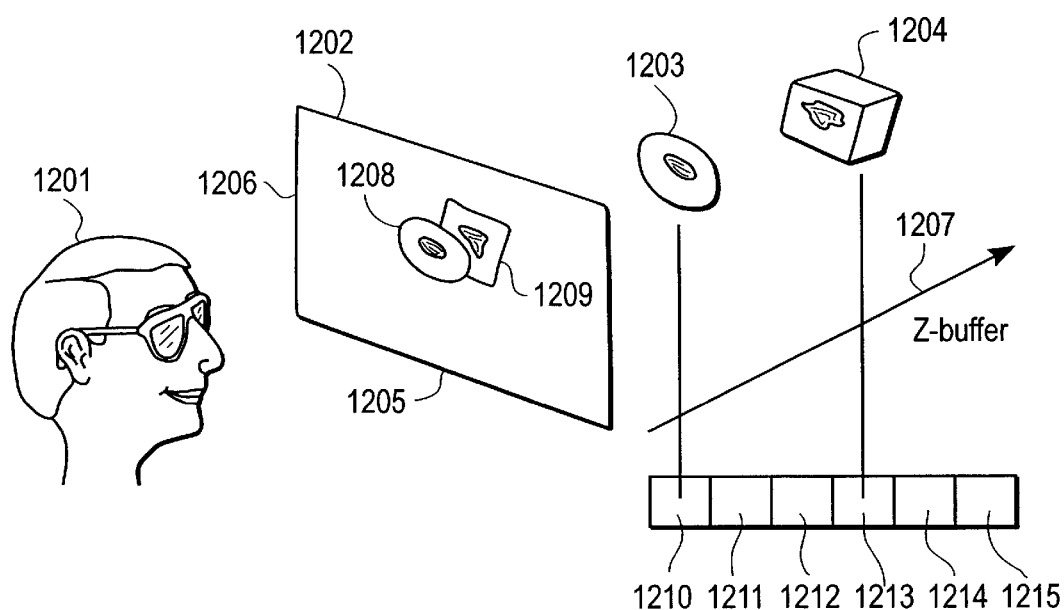
FIG. 12 illustrates an observer viewing a two dimensional display representation of a three dimensional scene which is produced by a display having a z-buffer in which the three dimensional scene has two objects which overlap in the x and y dimensions but which do not overlap in the z dimension.

FIG. 12 illustrates an observer viewing a two-dimensional display representation of a three-dimensional scene which is produced by a display having a z buffer in which the three-dimensional scene has two objects which overlap in the x and y dimensions but which do not overlap in the z dimension. Specifically, the observer 1201 views his display screen 1202 such as written by the display device 104 shown in FIG. 1. Sphere 1203 and cube 1204 exist in a logical three-dimensional space. The bottom edge of the display screen 1205 represents the x axis, the side edge 1206 of the display screen 1202 represents the y axis, and the arrow 1207 represents the z axis into the logical three-dimensional space. Projection 1208 displayed on the display screen 1202 corresponds to sphere 1203, while projection 1209 on the display screen 1202 represents cube 1204. From the frame of reference of the observer 1201, the sphere 1203 and cube 1204 overlap in the x and y dimensions as illustrated by the portion of projection 1209 which is covered by projection 1208 on the display screen 1202. In the three-dimensional space, however, the sphere 1203 and cube 1204 are non-overlapping in the z dimension 1207. FIG. 12 shows six distinct z values 1210 through 1215 into which objects in the three-dimensional space can be categorized. For example, sphere 1203 is placed in z buffer level 1210 which is closest to the observer 1201. Sphere 1204 resides at a z depth corresponding to the z buffer location 1213.

FIG. 13 illustrates the color and depth fields representing a color pixel having a 3-bit depth component for which the granularity is determined according to the methods of the present invention. For example, each pixel in the display screen 1202 is represented by a red value 1302, a green value 1303, and a blue value 1304 having any resolution desired. The implementation of a z buffer includes a depth component for each pixel, illustrated by the depth value $z_2$ $z_1$ $z_0$ shown in box 1301 in FIG. 13. Thus, the depth resolution for the z buffer format shown in FIG. 13 is three bits.

Figure 14:
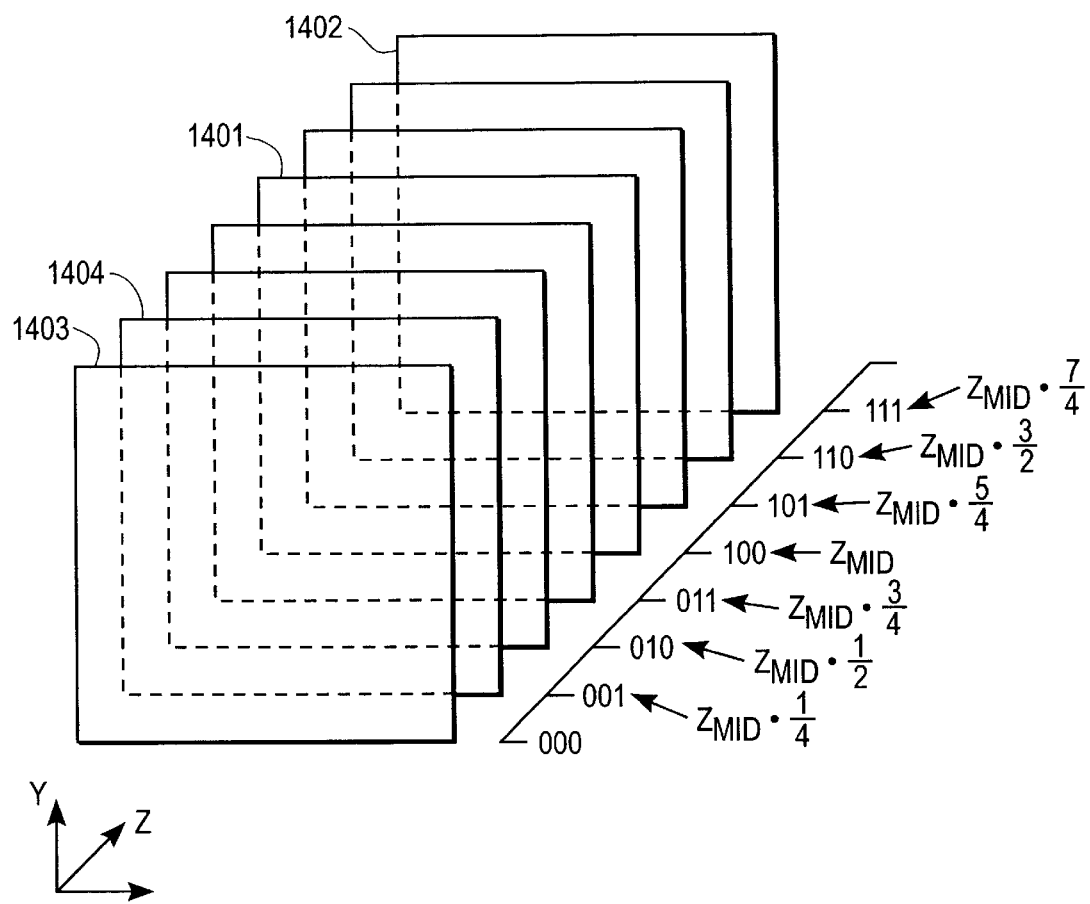
FIG. 14 illustrates eight two-dimensional components corresponding to a scene having a three-bit depth component such as shown in FIG. 13.

FIG. 14 illustrates eight two-dimensional components corresponding to a scene having a 3-bit depth component such as shown in FIG. 13. The three-dimensional logical space shown in FIG. 12 in which sphere 1203 and cube 1204 reside is constructed such that the z depth corresponding to each object is expressed in a continuous variable distance form, for example a real number depth having units of light years. For example, if object 1204 represents a cluster of stars in a distant galaxy, then the z value associated with the object takes on a value expressed in units of length on the order of millions of light years. Similarly if object 1203 represents a stone within the reach of the observer, then the actual z depth value associated with the object 1203 and the logical three-dimensional space again takes on units of length and is on the order of a few feet or inches. However, because the z depth value assigned to each pixel takes on a discrete number of values, the continuous range of distance in the logical space must be mapped to a discrete smaller number of codes representing the various lengths. In the example shown in FIG. 13, all objects must be categorized into one of eight discrete z buffer depths, even though the objects in the scene may exist at a variety of unique distances greater than eight unique distances.

In order to keep separate objects in separate z buffer depths,.it is desirable to calibrate the z buffer depth such that objects existing at different actual depths in the logical space are also positioned at distinct separate z buffer locations. One way to calibrate the z buffer is simply to average the actual continuous distances of all the objects in the scene to obtain a z buffer midpoint. Another manner of calibrating the z buffer granularity is to compute a weighted average of the continuous value to distances of the objects in the scene. These weights, or importance coefficients, are be determined by any one of a variety of methods. For example, they may be predetermined based upon the type of object in the scene, or they may be a function of the position of the object in the x and y dimension in the two-dimensional projection 1202 of the three-dimensional space, or may be a function of the amount of graphics resources used to display the two-dimensional projection of the object in previous frames. FIG. 14 shows the discrete z buffer codes and the continuous value transition points which correspond to an object being mapped into the corresponding code. For example, objects or pixels existing at a continuous value z depth of $3Z_{MID}/4$ up to $Z_{MID}$ are mapped into the z buffer code 101 which corresponds to the xy plane 1401. Objects that are farther away than $7Z_{MID}/4$ are mapped into the xy plane 1402 corresponding to the deepest distance which can be represented by the z buffer granularity as calibrated. All objects closer than $Z_{MID}/4$ are placed in to the closest xy plane 1403. In some implementations, objects that are farther away than $2Z_{MID}$ are culled from the display.

Figure 15:
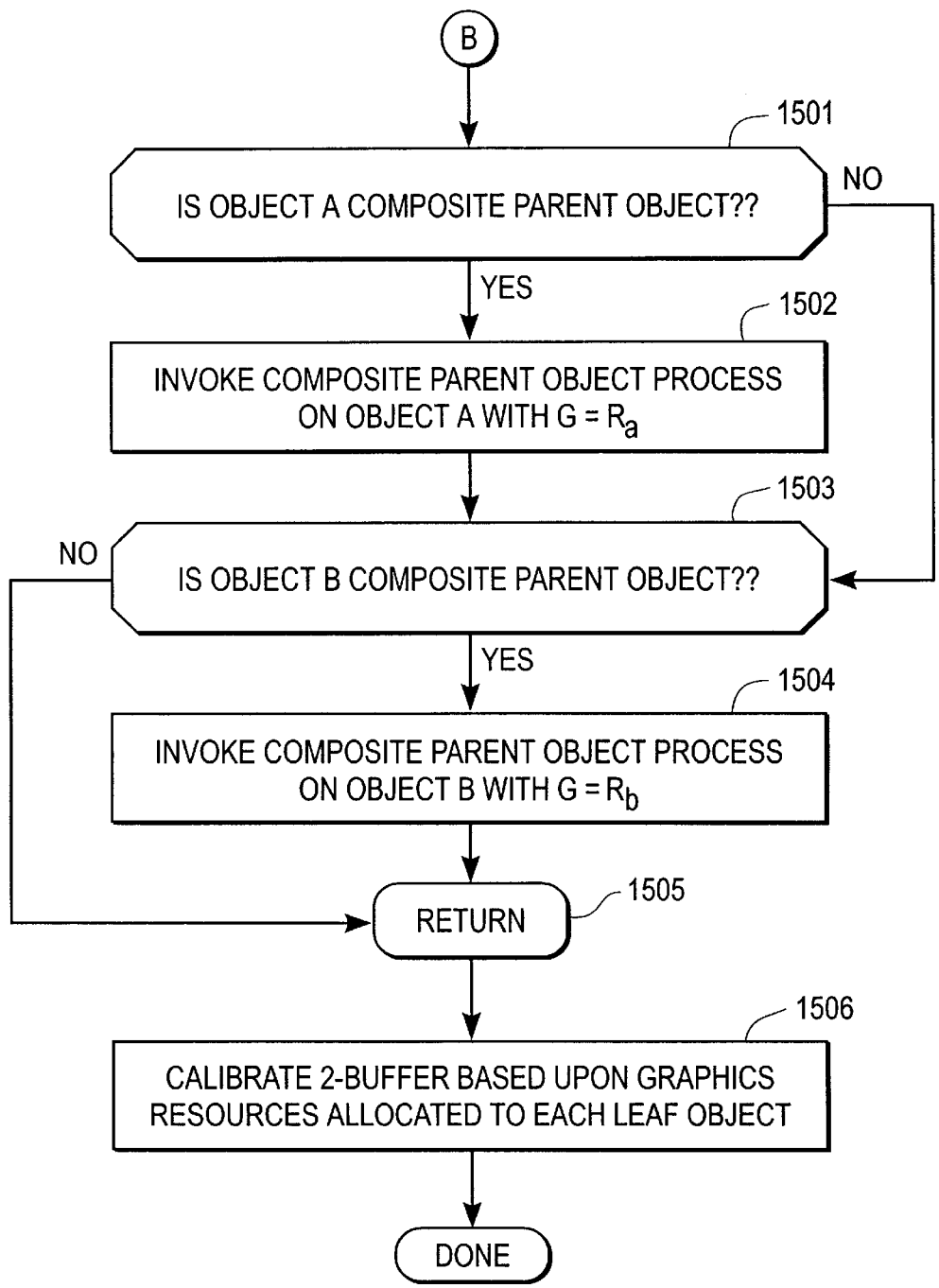
FIG. 15, along with FIGS. 5 and 6, illustrates a method for recursively determining the allocated resources for each object in a scene and for computing the z-buffer midpoint depth according to the methods of the present invention.

FIG. 15, along with FIGS. 5 and 6, illustrate the method for recursively determining the allocated resources for each object in a scene and for computing the z buffer midpoint depth according to the methods of the present invention.

According to the present invention, the same hit value statistical computations described above with regard to selections of level of details applied directly to allocating resources for determining z buffer granularity in a z buffer calibration computation. Equation 5 shows one method of computing a z buffer midpoint such as shown in FIG. 14 according to the preferred embodiment of the present invention.

$$Z_{MID} = \frac{\sum_{OBJECTS} (Rud)}{\sum_{OBJECTS} (Ru)} \qquad \text{(Equation 5)}$$

The allocated resources R corresponding to each object represents a weight which is combined with the importance coefficient u and the distance from the observation point d. The denominator in Equation 5 computes the sum of the weights corresponding to each object, and thereby normalizes the z buffer midpoint calculation. The numerator of Equation 5 is a weighted distance sum while the denominator is a weight sum. According to the present invention, the allocated resources $R_a$ are determined for object A in step 605, and the allocated resources $R_b$ are determined for object B in step 606.

In an alternative method for computing the z buffer midpoint according to the present invention, the z buffer midpoint is set to the distance of the object having the highest total weight. Thus, in this alternative $Z_{MID}$ is set equal to the distance d of the leaf object having the maximum R times u product.

At step 1501, the method determines if object A is a composite parent object. If so, the method invokes another recursive instantiation of the composite parent object process beginning at step 503 and continuing until step 1505. Thus, if object A is not a leaf object, step 1502 processes the binary tree beneath object A. The amount of available graphics resources G for the recursive instantiation is equal to the amount of graphics resources allocated $R_a$ to composite parent object A. In other words, all the leaf objects contained by object A will divide up the graphics resources $R_a$ allocated to object A.

After either the recursive instantiation of the composite parent object process invoked by step 1502 has returned (in the case that object A was a composite parent object) or after test 1501 has determined that object A was a leaf object, the method progresses to step 1503. At step 1503, the method determines if object B is a composite parent object. If so, the method invokes another instantiation of the composite parent object process beginning at step 503 and continuing until step 1505. Thus, if object B is not a leaf object, step 1504 processes the binary tree beneath object B. The amount of available graphics resources G for the recursive instantiation is equal to the amount of graphics resources allocated $R_b$ to composite parent object B. In other words, all the leaf objects contained by object B will divide up the graphics resources $R_b$ allocated to object B. If object B is a leaf object (and thus not a composite parent object), the allocated resources $R_b$ are all allocated to object B without further division.

After either the recursive instantiation of the composite parent object process invoked by step 1504 has returned (in the case that object B was a composite parent object) or if object B was determined by test 1503 to be a leaf object, the method returns from the recursive instantiation of the composite parent object process (steps 503 through 1505) to continue in the processing of object B's parent.

In the case that the return 1505 is to the invocation of the composite parent object instantiated after step 502 and corresponding to the scene object (such as 400 in FIG. 4) containing all leaf objects in the scene, then the method progresses to step 1506 to perform the z buffer calibration based upon all the graphics resources R allocated to each leaf object. As described above, in the cases that the return 1505 is to the recursive invocation of the composite parent object process corresponding to object A instantiated by step 1502 or is to the recursive invocation of the composite parent object process corresponding to object B instantiated by step 1504, then the return 1505 is to the portion of the object's parent process from which it was invoked. In this sense, steps 503 through 1505 represent a recursive method which is invoked at the highest level after step 502 on the scene object, and which is recursively invoked at lower levels by its own steps 1502 and 1504. Resources R have been allocated for all objects after the recursive method has returned form the highest level invocation on the scene object. Thus, at step. 1506, the z-buffer calibration is performed at step 1506 by one of the methods described above. The method according to the present invention is then complete at step 1507 as the z buffer has been calibrated for the current frame.

Table 3 below shows the various intermediate computations performed in the determination of the various allocated resources R dedicated to each object corresponding to the histogram of hit values shown in FIG. 8 with respect to the objects shown in the scene 200 in FIG. 2. In this example, the resources allocated are once again determined based upon the existence or absence of a particular object from the central portion 201 of the display screen during the previous ten frames. Line 11 of Table 3 shows that the total resources available for allocation in this example are 1,000. Because the z buffer computation described by Equation 5 involves normalization of the weighting factors, the remaining resources may take on any initial arbitrary value. For example, 10,000 could have been used just as well. In other words, for the purposes of the z buffer computation, the allocated resources R are used merely as a weighting factor in a computation for calibrating the z buffer but do not necessarily correspond to the graphics resources used in the display of the current frame.

TABLE 3

| | |
|---|---|
| 1) Normalized Risk Parameter (r) (step 502) | 0.5 |
| 2) Invoke Composite Parent Object Process On Scene Object With G = 1.000 (step 503) | Children J and COMP1 |
| 3) Mean Hit Value for Object J ($n_a$) (step 504) | 0.8 |
| 4) Mean Sum of Hit Values for Objects K and L ($n_b$) (step 505) | 1.0 |
| 5) Variance for Object J ($\sigma_a^2$) (step 506) | 0.16 |
| 6) Variance for Objects K and L ($\sigma_b^2$) (step 507) | 0.4 |
| 7) Minimum Risk ($\sigma_{MIN}$) (step 601) | 0.338 |
| 8) Maximum Risk ($\sigma_{MAX}$) (step 602) | 0.632 |
| 9) Non-Normalized Risk Parameter ($\sigma_{OPT}$) (step 603) | 0.485 |
| 10) Optimal Fraction ($f_{OPT}$) (step 604) | 0.249 |
| 11) Available Graphics Resources | 1.000 |
| 12) Resources Allocated for Object J ($R_a$) (step 605) | 0.249 |
| 13) Invoke Composite Parent Object Process On Scene Object With G = 0.751 (step 1504) | Children K and L |
| 14) Mean Hit Value for Object K ($n_a$) (step 504) | 0.6 |
| 15) Mean Hit Value for Object L ($n_b$) (step 505) | 0.4 |
| 16) Variance for Object K ($\sigma_a^2$) (step 506) | 0.24 |
| 17) Variance for Object L ($\sigma_b^2$) (step 507) | 0.24 |
| 18) Minimum Risk ($\sigma_{MIN}$) (step 601) | 0.346 |
| 19) Maximum Risk ($\sigma_{MAX}$) (step 602) | 0.490 |
| 20) Non-Normalized Risk Parameter ($\sigma_{OPT}$) (step 603) | 0.418 |
| 21) Optimal Fraction ($f_{opt}$) (step 604) | 0.838 |
| 22) Available Graphics Resources G | 0.751 |
| 23) Resources Allocated for Object K ($R_a$) (step 605) | 0.629 |
| 24) Resources Allocated for Object L ($R_b$) (step 606) | 0.122 |

FIG. 16 illustrates the importance coefficients, the distances from the observer, and the allocated resources for each of the objects shown in the scene shown in FIG. 2 for the purposes of demonstrating the calibration of the z buffer according to the present invention. The allocated resources R are determined based upon the hit values shown in FIG. 8. In the example shown in FIG. 16, the importance coefficients u indicate that object J is more important that object K which is more important than object L.

FIG. 17 illustrates the range of distances corresponding to each of the unique depth codes for the 3-bit depth component determined by the methods according to the present invention. The ranges shown in FIG. 17 are computed in the manner shown in FIG. 14 for determining the transition point for each continuous depth value to the next higher corresponding discrete code.

FIG. 18 illustrates the 3-bit depth components computed in accordance with the present invention corresponding to the objects listed in FIG. 16 and shown in the scene of FIG. 2. Thus, because FIG. 16 shows that object J exists sixteen feet from the observer, according to FIG. 17 object J maps into depth code 111 corresponding to the deepest plane 1402 shown in FIG. 4. Because object K exists at a distance four feet from the observer, it falls into plane 001 represented by plane 1404 in FIG. 14. Similarly, because object L is at a distance of nine feet from the observer as shown by FIG. 16, object L is mapped into a depth code of 100 corresponding to the plane 1401 shown in FIG. 14.

While the various aspects of the present invention have been described with reference to several aspects and their embodiments, those embodiments are offered by way of example, not be way of limitation. The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical applications to thereby enable others skilled in the art to best utilize the invention in various embodiments and with various modifications as are suited to the particular use contemplated. Those skilled in the art will be enabled by this disclosure will be enabled by this disclosure to make various obvious additions or modifications to the embodiments described herein; those additions and modifications are deemed to lie within the scope of the present invention. It is intended that the scope of the invention be defined by the claims appended hereto.

What is claimed is:

1. A method for determining a z-buffer granularity in a scene represented by a binary tree having leaf objects, the method comprising the steps of:
    (a) determining a non-normalized risk parameter;
    (b) computing a primary hit value mean for a first object;
    (c) computing a secondary hit value mean for a second object;
    (d) computing a primary hit value variance for the first object;
    (e) computing a secondary hit value variance for the second object;
    (f) determining an optimal fraction of available graphics resources to be allocated to the first object based upon the non-normalized risk parameter, the primary hit value mean, the secondary hit value mean, the primary hit value variance, and the secondary hit value variance; and
    (i) computing a z-buffer average depth based upon allocated graphics resources for each leaf object and a distance of each object from an observation point.

2. A method as in claim 1, further comprising, between steps (f) and (i), the steps of:
    (g) if the first object is a composite parent object, recursively invoking steps (b) through (h) on children objects of the first object; and
    (h) if the second object is a composite parent object, recursively invoking steps (b) through (h) on children objects of the second object.

3. A method as in claim 1, wherein the step of determining the non-normalized risk parameter includes the steps of:
    determining a normalized risk parameter;
    computing a minimum risk from the primary hit value variance and secondary hit value variance;
    computing a maximum risk from the primary hit value mean, the secondary hit value mean, the primary hit value variance, and the secondary hit value variance; and
    computing the non-normalized risk parameter from the minimum risk, the maximum risk, and the normalized risk parameter.

4. A method as in claim 3, wherein the step of determining a normalized risk parameter includes the step of:
    receiving the normalized risk parameter from an application.

5. A method as in claim 3, wherein the normalized risk parameter is greater than or equal to zero and less than or equal to one.

6. A method as in claim 1, wherein the step of determining the optimal fraction of available graphics resources to be allocated to the object includes the steps of:
    solving a quadratic variance equation for the optimal fraction.

7. A method as in claim 6, wherein the step of solving a quadratic variance equation includes the steps of:
    if the primary hit value mean is greater than or equal to the secondary hit value mean, selecting a greater solution of the quadratic variance equation as the optimal fraction; and
    if the primary hit value mean is less than the secondary hit value mean, selecting a lesser solution of the quadratic variance equation as the optimal fraction.

8. A method as in claim 1, wherein the step of computing a z-buffer average depth includes the steps of:
    computing a weighted distance sum by summing a product of the allocated graphics resources for each object and the distance of each object from the observation point;
    computing a weight sum by summing the allocated graphics resources for each object; and
    dividing the weighted distance sum by the weight sum.

9. A method as in claim 1, wherein the step of computing a z-buffer average depth includes the steps of:
    computing a weighted distance sum by summing multiplicative products of the allocated graphics resources for each object, the distance of each object from the observation point, and an importance coefficient for each object;
    computing a weight sum by summing multiplicative products of the allocated graphics resources for each object and an importance coefficient for each object; and
    dividing the weighted distance sum by the weight sum.

10. A method as in claim 1, wherein the primary hit value mean, the secondary hit value mean, the primary hit value variance, and the secondary hit value variance are each computed from a histogram of hit values over a predetermined number of previous frames.

11. A method as in claim 10,
    wherein the histogram includes hit values over the predetermined number of immediately previous frames; and
    wherein the hit values for the object in the histogram comprise one when the object is in a central portion of the scene, and zero when the object is not in the central portion of the scene.

12. A method as in claim 11,
    wherein the histogram includes hit values over the predetermined number of immediately previous frames; and
    wherein the hit values for the object in the histogram comprise values corresponding to the amount of graphics resources used by the object.

13. A method as in claim 1,
wherein the first and second objects are composite parent objects.

14. An apparatus for displaying a graphics scene, comprising:
a processor;
a display device coupled to the processor; and
a processor readable storage medium coupled to the processor containing processor readable program code for programming the apparatus to perform a method for determining a z-buffer granularity in a scene represented by a binary tree having leaf objects, the method comprising the steps of:
(a) determining a non-normalized risk parameter;
(b) computing a primary hit value mean for a first object;
(c) computing a secondary hit value mean for a second object;
(d) computing a primary hit value variance for the first object;
(e) computing a secondary hit value variance for the second object;
(f) determining an optimal fraction of available graphics resources to be allocated to the first object based upon the non-normalized risk parameter, the primary hit value mean, the secondary hit value mean, the primary hit value variance, and the secondary hit value variance; and
(i) computing a z-buffer average depth based upon allocated graphics resources for each leaf object and a distance of each object from an observation point.

15. An apparatus as in claim 14, further comprising, between steps (f) and (i), the steps of
(g) if the first object is a composite parent object, recursively invoking steps (b) through (h) on children objects of the first object; and
(h) if the second object is a composite parent object, recursively invoking steps (b) through (h) on children objects of the second object.

16. An apparatus as in claim 14, wherein the step of determining the non-normalized risk parameter includes the steps of:
determining a normalized risk parameter;
computing a minimum risk from the primary hit value variance and secondary hit value variance;
computing a maximum risk from the primary hit value mean, the secondary hit value mean, the primary hit value variance, and the secondary hit value variance; and
computing the non-normalized risk parameter from the minimum risk, the maximum risk, and the normalized risk parameter.

17. An apparatus as in claim 16, wherein the step of determining a normalized risk parameter includes the step of:
receiving the normalized risk parameter from an application.

18. An apparatus as in claim 16, wherein the normalized risk parameter is greater than or equal to zero and less than or equal to one.

19. An apparatus as in claim 14, wherein the step of determining the optimal fraction of available graphics resources to be allocated to the object includes the steps of:
solving a quadratic variance equation for the optimal fraction.

20. An apparatus as in claim 19, wherein the step of solving a quadratic variance equation includes the steps of:
if the primary hit value mean is greater than or equal to the secondary hit value mean, selecting a greater solution of the quadratic variance equation as the optimal fraction; and
if the primary hit value mean is less than the secondary hit value mean, selecting a lesser solution of the quadratic variance equation as the optimal fraction.

21. An apparatus as in claim 14, wherein the step of computing a z-buffer average depth includes the steps of:
computing a weighted distance sum by summing a product of the allocated graphics resources for each object and the distance of each object from the observation point;
computing a weight sum by summing the allocated graphics resources for each object; and
dividing the weighted distance sum by the weight sum.

22. An apparatus as in claim 14, wherein the step of computing a z-buffer average depth includes the steps of:
computing a weighted distance sum by summing multiplicative products of the allocated graphics resources for each object, the distance of each object from the observation point, and an importance coefficient for each object;
computing a weight sum by summing multiplicative products of the allocated graphics resources for each object and an importance coefficient for each object; and
dividing the weighted distance sum by the weight sum.

23. An apparatus as in claim 14, wherein the primary hit value mean, the secondary hit value mean, the primary hit value variance, and the secondary hit value variance are each computed from a histogram of hit values over a predetermined number of previous frames.

24. An apparatus as in claim 14 or 9,
wherein the histogram includes hit values over the predetermined number of immediately previous frames; and
wherein the hit values for the object in the histogram comprise one when the object is in a central portion of the scene, and zero when the object is not in the central portion of the scene.

25. An apparatus as in claim 14 or 10,
wherein the histogram includes hit values over the predetermined number of immediately previous frames; and
wherein the hit values for the object in the histogram comprise values corresponding to the amount of graphics resources used by the object.

26. An apparatus as in claim 14,
wherein the first and second objects are composite parent objects.

* * * * *